(12) United States Patent
Higuchi et al.

(10) Patent No.: US 7,620,462 B2
(45) Date of Patent: Nov. 17, 2009

(54) ROBUST DIGITAL CONTROLLER AND ITS DESIGNING DEVICE

(75) Inventors: Kouji Higuchi, Chofu (JP); Kazushi Nakano, Chofu (JP); Tatsuyoshi Kajikawa, Chofu (JP); Eiji Takegami, Shinagawa-ku (JP); Kazushi Watanabe, Shinagawa-ku (JP); Satoshi Tomioka, Shinagawa-ku (JP)

(73) Assignees: University of Electro-Communications, Tokyo (JP); Kabushiki Kaisha Campuscreate, Tokyo (JP); TDK-Lambda Corporation, Tokyo (JP)

( * ) Notice: Subject to any disclaimer, the term of this patent is extended or adjusted under 35 U.S.C. 154(b) by 181 days.

(21) Appl. No.: 11/572,778

(22) PCT Filed: Jul. 28, 2005

(86) PCT No.: PCT/JP2005/013834

§ 371 (c)(1),
(2), (4) Date: Mar. 21, 2007

(87) PCT Pub. No.: WO2006/013776

PCT Pub. Date: Feb. 9, 2006

(65) Prior Publication Data

US 2007/0250186 A1    Oct. 25, 2007

(30) Foreign Application Priority Data

Aug. 2, 2004    (JP)    ............... 2004-226067

(51) Int. Cl.
    G05B 13/02    (2006.01)
    G05B 19/29    (2006.01)
    G05B 11/01    (2006.01)
(52) U.S. Cl. .................. 700/37; 700/44; 700/45; 318/600; 318/628

(58) Field of Classification Search .................. 700/28, 700/29, 32, 37, 44, 45, 71; 318/560, 561, 318/563, 600, 628
See application file for complete search history.

(56) References Cited

U.S. PATENT DOCUMENTS 4,953,076 A * 8/1990 Yamamoto .................... 700/71

(Continued)

FOREIGN PATENT DOCUMENTS

JP    04279907 A  *  10/1992

OTHER PUBLICATIONS

International Preliminary Report on Patentability for PCT/JP2005/013834 (Date of submission of the demand: Feb. 14, 2006).

(Continued)

*Primary Examiner*—Crystal J Barnes-Bullock
(74) *Attorney, Agent, or Firm*—Darby & Darby P.C.

(57) ABSTRACT

A robust digital controller is equipped with a high degree of approximation and is able to incorporate a novel two-degree-of-freedom robust digital control system without substantially considering the magnitude of the control inputs and there is provided its designing device. A control compensating means is configured as an integral type control system in which a discrete transfer function $W_{ry}(z)$ between a target value r and a controlled variable y is approximated to a higher-approximate quadratic approximate model transfer function $W_m(z)$ and an arithmetic processing can be performed within the digital controller based on the model transfer function $W_m(z)$. Further, the designing device automatically calculates parameters constituting the control system. Consequently, a robust digital controller can be easily realized that is equipped with a high degree of approximation as compared with a conventional approximate digital control system for realizing a first-order model and is robust against output noises.

8 Claims, 22 Drawing Sheets

OTHER PUBLICATIONS

K. Higuchi, et al., Robust Control of PWM Power Amplifier by Approximate 2-Degree-of-Freedom Integral-Type Digital Controller with Bumpless Mode Switching, The Transactions of the Institute of Electronics, Information and Communication Engineers C, Jan. 2004, vol. J87-C, No. 1, pp. 148-159.

K. Higuchi, et al., The Robust Design of PWM Power Amplifier by the Approximate 2-Degree-of-Freedom Integral Type Servo System, pp. 2297-2302, 2000.

K. Higuchi, et al., Design of a Robust PWM Power Amplifier Using Approximate 2-Degree-of-Freedom Integral Type Control, The Journal of the Institute of Electrical Engineers of Japan, vol. 122, No. 2, pp. 96-103, 2002.

K. Higuchi, et al., Design of Robust PWM Power Amplifier Using Approximate 2-Degree-of-Freedom Digital Integral Type Control Only with Voltage Feedback, The Journal of the Institute of Electronic, Information and Communication Engineers, vol. J85-C, No. 10, pp. 906-916, Oct. 2002.

* cited by examiner

ROBUST DIGITAL CONTROLLER AND ITS DESIGNING DEVICE

CROSS-REFERENCE TO PRIOR APPLICATIONS

This is a U.S. national phase application under 35 U.S.C. § 371 of International Patent Application No. PCT/JP2005/013834 filed Jul. 28, 2005, and claims the benefit of Japanese Application No. 2004-226067 filed Aug. 2, 2004. The International Application was published in Japanese on Feb. 9, 2006 as International Publication No. WO 2006/013776 under PCT Article 21(2) the content of which is incorporated herein in its entirety.

TECHNICAL FIELD

The present invention relates to a robust digital controller that is incorporated in a PWM power amplifier or the like including, e.g., a switching regulator, to perform feedback control so that an output voltage supplied to a load is proportional to a command signal. Particularly, the present invention pertains to a robust digital controller and its designing device that are capable of handling wide-range variations in load and in power supply voltage using a single system.

BACKGROUND ART

A pulse width modulation (PWM) power amplifier is generally utilized, e.g., as a power supply or an amplifier. In this PWM power amplifier, a PWM switching circuit is employed as a power converter circuit, and an LC filter for eliminating noises is inserted between the power converter circuit and a load, and further a feedback control system is configured so that an output voltage supplied to the load becomes proportional to a command signal. At this time, the characteristics of the load to which the PWM power amplifier is applied range as widely as from the capacitive to the inductive, while the magnitude of the load varies to a large extent from a zero to a maximum of an amplifier's rating. Consequently, a robust PWM power amplifier is needed which can respond to such wide-range variations in load and in DC power supply voltage using one controller.

Designing methods for an analogue controller in such a robust PWM power amplifier are disclosed, e.g., in "The robust design of PWM power amplifier by the approximate 2-degree-of-freedom integral type servo system", Proc. IEEE IECON-2000, pp. 2297-2302, 2000; and K. Higuchi, K. Nakano, K. Araki, and F. Chino, "The robust design of PWM power amplifier by the approximate 2-degree-of-freedom digital integral type control system", The journal of the Institute of Electrical Engineers of Japan, Vol. 122, No. 2, pp. 96-103, 2002. In the methods, however, current feedback and voltage feedback, on which carrier noises are superimposed, are utilized in controllers. In order to suppress noise effect on the controller, however, an amount of feedback signals should desirably be small and a current detecting sensor is generally expensive, and thus a controller using only the voltage feedback is desirable. In that case, since no current feedback is employed, a configuration of the analogue controller becomes of complexity which leads difficulty to realize the configuration. In the case of the digital controller, however, the use of DSP (Digital Signal Processor) can facilitate realization of the digital controller.

Then, the designing method of the robust digital controller in the PWM power amplifier that satisfies the foregoing demands is proposed in K. Higuchi, K. Nakano, K. Araki, and F. Chino, "The robust design of PWM power amplifier by the approximate 2-degree-of-freedom integral type control system only with voltage feedback", The journal of the Institute of Electronic, Information and Communication Engineers, Vol. J-85-C, No. 10, pp. 1-11 (2002.10) ("Higuchi et al.").

In the digital feedback control system, there occurs an input dead time longer than in the analogue feedback control system. This input dead time is attributable mainly to a calculation time-lag of DSP, a conversion time from an analog signal to a digital code (AD conversion) and a conversion time from a digital code to an analog signal (DA conversion), a time-lag at a triangle wave comparison section or the like. Focusing on this point, by taking into consideration the input dead time and the conversion of the current feedback into the voltage feedback, the foregoing Higuchi et al. expressed control targets (a PWM signal generating section, a power converter circuit and an LC filter) with a discrete-time system whose order is higher by two orders than a continuous-time system, and proposed a state feedback system for attaining target characteristics given for the control target. Further, the foregoing Higuchi et al. proposed that after the state feedback system is converted equivalently into an output feedback system using only voltage, an approximate two-degree-of-freedom digital robust control system can be constituted, when a robust compensator obtained by approximating the output feedback system is connected, while by applying an equivalent conversion to this digital robust control system, a digital integral type controller using only the voltage feedback can be obtained.

In the foregoing documents, a method for constituting an approximate two-degree-of-freedom digital robust control system, which realizes a first-order approximate model, was shown. In a robust digital controller with such a control system incorporated therein, it is difficult to limit the magnitude of a control input while increasing a degree of approximation. Consequently, it was needed to provide a robust digital controller in which a high degree of approximation is easily possible and at the same time there is no need to take the magnitude of the control input into consideration. Further, with regard to the two-degree-of-freedom robust digital controller proposed in the above documents, a clear parameter determining means for enhancing the degree of the approximation of the robust digital controller is not disclosed. Thus, the substantial amount of trial and error was needed to determine the parameters, requiring a large amount of labor hours. Thus, it was needed to provide a designing device having a clear parameter determining means for allowing anyone to design the parameters easily.

The present invention addresses the problems mentioned above. Therefore, the first objective of the present invention is to provide a robust digital controller incorporating a novel two-degree-of freedom robust digital control system with a high degree of approximation and without the need for considering the magnitude of the control input. Further, the second objective of the present invention is to provide a designing device for such a robust digital controller.

SUMMARY OF THE INVENTION

According to a first aspect of the robust digital controller of the present invention, a discrete transfer function $W_{ry}(z)$ between a target value r and a controlled variable y is determined as a quadratic approximate model transfer function $W_m(z)$ with a higher degree of approximation, and an integral type control system capable of performing arithmetic processing within the digital controller is configured based on the model transfer function $W_m(z)$. Consequently, a digital controller that provides a higher degree of approximation as compared with a conventional approximate digital control system for realizing a first-order approximation model and is robust against output noises can be easily realized. Besides, a robust design of a digital controller can be easily performed with little consideration for the magnitude of the control input.

According to a second aspect of the robust digital controller of the present invention, a control compensation means incorporated into the robust digital controller requires none of the first to third feedforward means described below. Hence, no heavy burden is imposed on the arithmetic capacity of the digital controller.

According to a third aspect of the robust digital controller of the present invention, a more highly precise control can be realized by adding feedforward process networks to the control compensation means.

According to a fourth aspect of the present invention, a voltage feedback system from a controlled variable y and a pole feedback system of a dynamic compensating filter permit equivalent conversion of a current feedback system into the voltage feedback system, and therefore a voltage feedback from a control target eliminates an input dead time peculiar to digital control, and further a voltage feedback system relating to zeros can enhance a degree of approximation of a quadratic approximate model, and furthermore addition of feedforward networks from a control target value can realize a matching model of target characteristics that is robust against disturbance in required frequency bandwidth.

According to the fifth aspect of the present invention, each of parameter values $k_1$, $k_2$, $k_3$, $k_4$, $k_5$, $k_6$, $k_i$, $k_{i2}$, $k_{in}$ that are able to afford desired characteristics can be simply obtained by the designing device without performing a complicated procedure. Further, in the digital controller with each of these parameters incorporated therein, a discrete transfer function $W_{ry}(z)$ between a target value r and a controlled variable y is determined as a quadratic approximate model transfer function $W_m(z)$ with a higher degree of approximation, and thus an integral type control system capable of performing arithmetic processes internally is configured based on this model transfer function $W_m(z)$. Consequently, there can be realized a digital controller that provides the higher degree of approximation as compared with the conventional approximate digital controller for realizing a first-order approximate model and is robust against output noises. Further, a robust design of the digital controller can be easily accomplished with little consideration for the magnitude of the control input.

Further, this digital controller needs none of the first to third feedfoward means hereinafter described. Hence, no heavy burden is imposed on the arithmetic capacity of the digital controller and besides the designing device also need not calculate these feedforward parameters, thus permitting a processing time to be shortened.

According to the sixth aspect of the present invention, by adding feedforward processing networks as an integral type control system of the digital controller, the digital controller can realize more precise control. Therefore, in response to this digital controller, also the designing device can calculate the parameter values including the parameters relevant to the feedforward processing networks.

According to a seventh aspect of the present invention, each of parameter values $k_1$, $k_2$, $k_3$, $k_4$, $k_{i1}$, $k_{i2}$, that are able to afford desired characteristics are simply obtained by the designing device without performing a complicated procedure. Further, in the digital controller with each of these parameters incorporated therein, a discrete transfer function $W_{ry}(z)$ between a target value r and a controlled variable y is determined as a first-order approximate model transfer function $W_m(z)$ with a comparatively simple processing formation, and thus an integral type control system capable of performing internally an arithmetic processing is configured based on the model transfer function $W_m(z)$. Consequently, by utilizing this novel designing device as well, a robust design can be simply performed for approximate two-degree-of-freedom robust digital control system for realizing a first-order approximate model.

Further, since this digital controller needs none of the first and the second feedforward means hereinafter described, hence, no heavy burden is imposed on the arithmetic capacity of the digital controller, and besides the designing device also need not calculate these feedforward parameters, thus permitting a processing time to be shortened.

According to the eighth aspect of the present invention, by adding feedforward processing networks as an integral type control system of the digital controller, the digital controller can realize even more precise control and therefore, in response to this digital controller, also the designing device can calculate each of the parameter values including the parameters relevant to the feedforward processing networks.

According to the ninth aspect of the present invention, each of the parameter values calculated by a controller parameter determining means is output directly to the digital controller, so that the need of inputting the parameters one by one to the digital controller can be eliminated.

According to the tenth aspect of the present invention, each of the parameter values capable of affording desired characteristics is automatically calculated by a controller parameter determining means, hence, utilizing each of final parameter values calculated by the controller parameter determining means ensures the provision of a robust design of the digital controller.

According to the eleventh aspect of the present invention, only the respective parameters capable of affording desired characteristics are output directly to the digital controller. Hence, a robust design of the digital controller can be simply and more reliably performed.

According to the robust digital controller of the first aspect of the present invention, there can be incorporated a novel two-degree-of-freedom robust digital control system that can afford a high degree of approximation and besides has no need of considering the magnitude of a control input.

According to the robust digital controller of the second aspect of the present invention, no heavy burden is imposed on an arithmetic capacity of a digital controller.

According to the robust digital controller of the third aspect of the present invention, even more precise control can be realized by incorporating feedforward processing networks.

According to the robust digital controller of the fourth aspect of the present invention, utilizing voltage feedback without using current feedback, a performance equivalent to that when the current feedback was used can be obtained. Hence, the cost of a digital controller can be reduced, and a dead time due to digital control is eliminated, shortening a response time of a control system, and further a degree of approximation in an approximate model is improved to enable a model matching for target characteristics, thus permitting robust control against disturbances to be realized.

According to the fifth aspect of the present invention, utilizing parameter values obtained by a designing device can easily provide a robust digital controller with a high degree of approximation and with no need of consideration for the magnitude of a control input. Further, since parameters for feedforward need not be calculated, a processing time of the designing device can be shortened by just that much.

According to the sixth aspect of the present invention, each of the parameter values including the parameters relevant to the feedforward can be calculated by the designing device.

According to the seventh aspect of the invention, an easy design is possible for the configuration of an approximate two-degree-of-freedom robust digital control system for realizing a first-order approximate model.

According to the eighth aspect of the present invention, each of parameter values including the parameters relevant to feedforward can be calculated by a designing device.

According to the ninth aspect of the invention, the need of inputting parameter values one by one to a digital controller can be eliminated.

According to the tenth aspect of the invention, a robust design of a digital controller can be reliably performed.

According to the eleventh aspect of the invention, robust design of a digital controller can be simply and more reliably performed.

DETAILED DESCRIPTION OF THE INVENTION

Preferred embodiments of a robust digital controller and its designing device according to the present invention will be described in detail hereinafter, with reference to the accompanying drawings.

Embodiment 1

Figure 1:
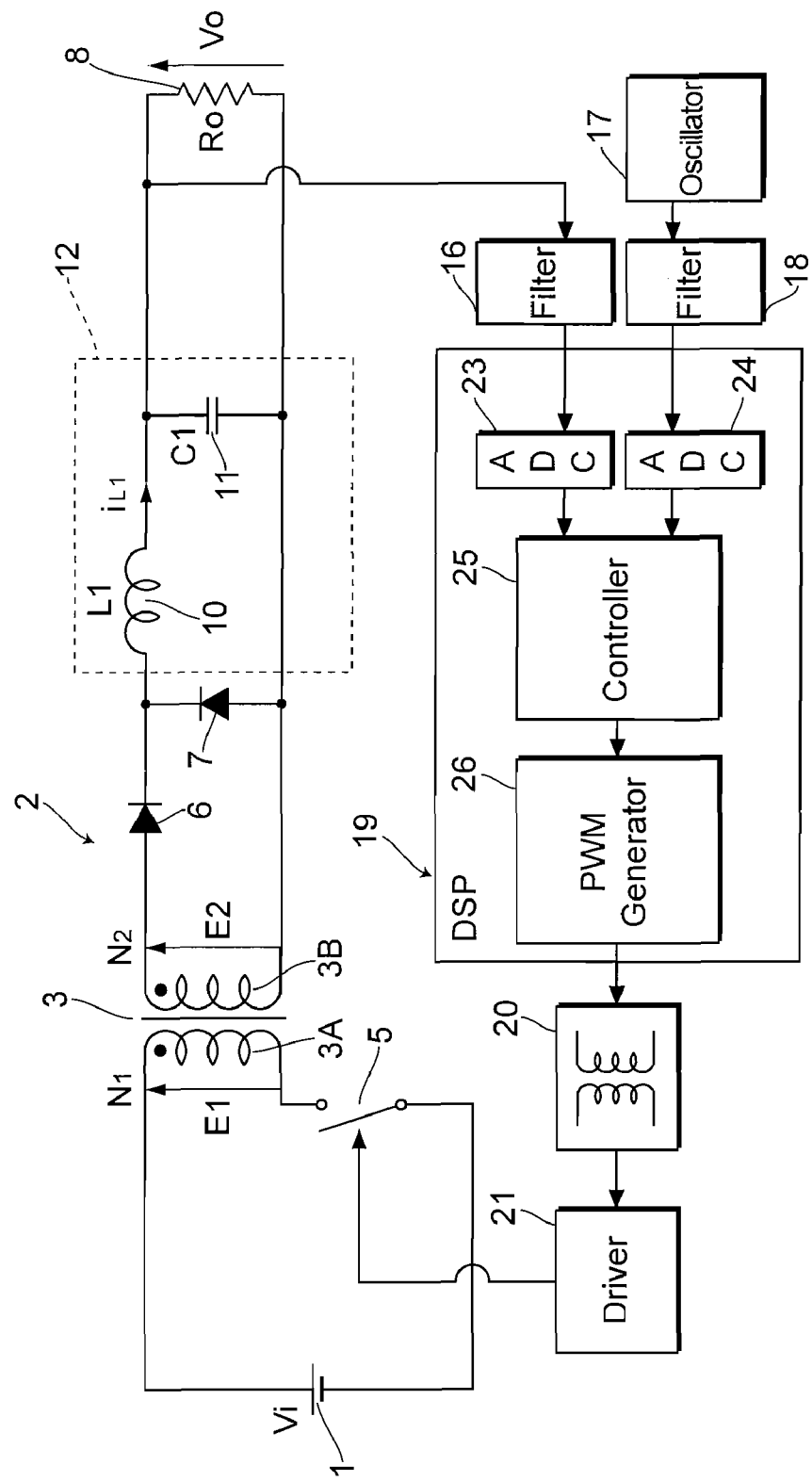
FIG. 1 is a circuit diagram of a PWM power amplifier including a robust digital controller, according to a first embodiment of the present invention.

FIG. 1 illustrates a circuitry of a PWM power amplifier including a robust digital controller applicable to the present embodiment. In FIG. 1, numeral 1 denotes a DC power source. Numeral 2 denotes a power conversion circuit, e.g. a forward type converter section 2. A series circuit, which forms a primary circuit of the converter section 2, comprising a primary winding 3A of a transformer 3 and a switching element 5 is connected across both terminals of the DC power source 1. An input voltage Vi from the DC power source 1 is applied intermittently to the primary winding 3A of the transformer 3 as a voltage E1, by the switching operation of the switching element 5. Further, a secondary circuit of the converter section 2 comprises a secondary winding 3B of the transformer 3 electrically insulated from the primary winding 3A, a rectifier diode 6 or a rectifier element, and a free-wheeling diode 7 or a commutation element. Furthermore, an LC filter circuit 12 comprising a choke coil 10 and a smoothing capacitor 11 is inserted and connected between the secondary circuit of the converter section 2 and a load 8. Then, voltage E2 induced in the secondary winding 3B by the switching action of the switching element 5 is rectified by the rectifier diode 6 and the free-wheeling diode 7 and then the voltage E2 is supplied to the load 8 as an output voltage Vo after removing noise components by the LC filter circuit 12.

On the other hand, numeral symbol 15 denotes a feedback circuit for realizing a feedback control system that is provided to stabilize the output voltage Vo. The feedback circuit comprises a first low-pass filter 16 for blocking noise components of voltage feedback signals at the same level as the output voltage Vo, an oscillator 17 for generating carrier waves having triangle or saw tooth waveforms with a given amplitude Cm and a carrier frequency, a second low-pass filter 18 for blocking noise components of the carrier waves generated from the oscillator 17, a DSP (Digital Signal Processor) 19 or a digital controller that compares voltage levels of the current feedback signals and carrier waves with each other to output PWM (Pulse Width Modulation) switching signals with on-time duration depending on the comparison result, an insulating transformer 20 for insulating the PWM switching signals electrically from DSP 19 to transmit the PWM switching signals, and a driver circuit 21 for amplifying the PWM switching signals to supply the switching signals to a control terminal of the switching element 5.

To elaborate the DSP 19 configuration in more depth, DSP 19 incorporates a first AD converter 23 for digitally converting the voltage feedback signals from the first low-pass filter 16; a second AD converter 24 for digitally converting analogue carrier waves from the second low-pass filter 18; a controller 25 serving as a substantial digital processor for comparing voltage levels of discrete voltage feedback signals and carrier waves with each other to determine the on-time duration of the PWM switching signal; and a PWM generator 26 as a PWM signal generator for generating the PWM switching signals based on the on-time duration obtained by the controller 25. In addition, DSP 19 shown in FIG. 1 is provided separately from the oscillator 17. It may, however, incorporate a function serving as the oscillator 17. DSP 19 in the present embodiment includes a novel feature in the functional architecture incorporated in the controller 25.

In the present embodiment, the PWM power amplifier is designed and manufactured to satisfy the following specification:

(1) The input voltage Vi shall be 48V and the output voltage Vo shall be 3.3 V.

(2) A start-up transient response characteristic with a resistance load shall be substantially the same as the one with a parallel-connected load comprising resistance and capacitance (where the ranges of the resistance RL and capacitance CL of the capacitor are $0.165 \leq RL \leq \infty(\Omega)$ (e.g., RL ranges from 0.165 to infinity) and $0 \leq CL \leq 200$ (μF) (e.g., CL ranges from zero to 200 μF), respectively).

(3) A rise time of a transient response on start-up shall be shorter than 100 (μsec).

(4) No overshoot shall arise for all loads at the time of the transient response on start-up.

(5) A dynamic load response shall be lower than 50 (mV) against a 10 (A) change in load current.

(6) Even if the input voltage Vi varies by ±20%, the characteristics (2) to (5) mentioned above should be satisfied.

Figure 2:
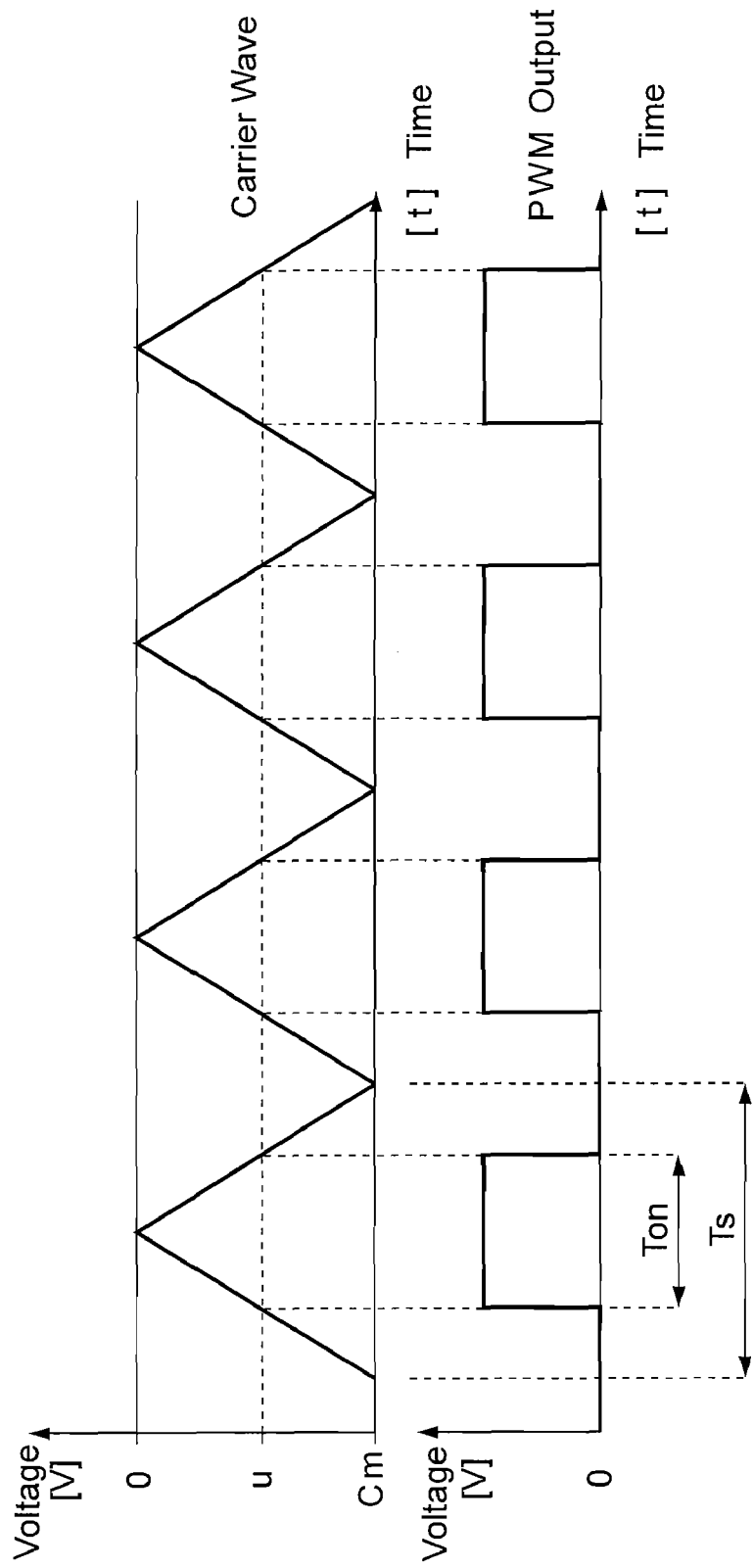
FIG. 2 is a waveform chart of a carrier wave and PWM output of the robust digital controller, according to the first embodiment of the present invention.

Now, a gain $K_p$ of the converter section 2 including the LC filter circuit is calculated from each of the carrier waveforms and PWM switching signals (PWM output) that are shown in FIG. 2. In the figure, the carrier waveforms and PWM switching signals are shown at the upper and lower sides, respectively, where Cm indicates a minus peak voltage of the carrier wave, while u denotes a voltage level of the voltage feedback signal. Besides, $T_s$, $T_{on}$ indicate a period of the PWM switching signal and on-time duration, respectively.

In this case, a voltage Vin of the voltage feedback signal fed to the first low-pass filter 16 is expressed by the following equation 15.

$$V_{in} = \frac{T_{on}}{T_s} \cdot \frac{Vi}{\frac{N_1}{N_2}} = \frac{C_m - u}{C_m} \cdot Vi \cdot \frac{N_2}{N_1} \qquad \text{Equation 15}$$

As an example, assuming that the input voltage is Vi=48V, a ratio of the number of turns N1 of the primary winding 3A to N2 of the secondary winding 3B of the transformer 3 is 8:2 (I.e., N1:N2=8:2), and minus peak voltage is Cm=−66V, then Vin=−0.18×(u−66) is obtained, and thus, the gain $K_p$ is calculated as follows:

$$K_p = \frac{Vi}{C_m} \cdot \frac{N_2}{N_1} = -0.18 \qquad \text{Equation 16}$$

Figure 3:
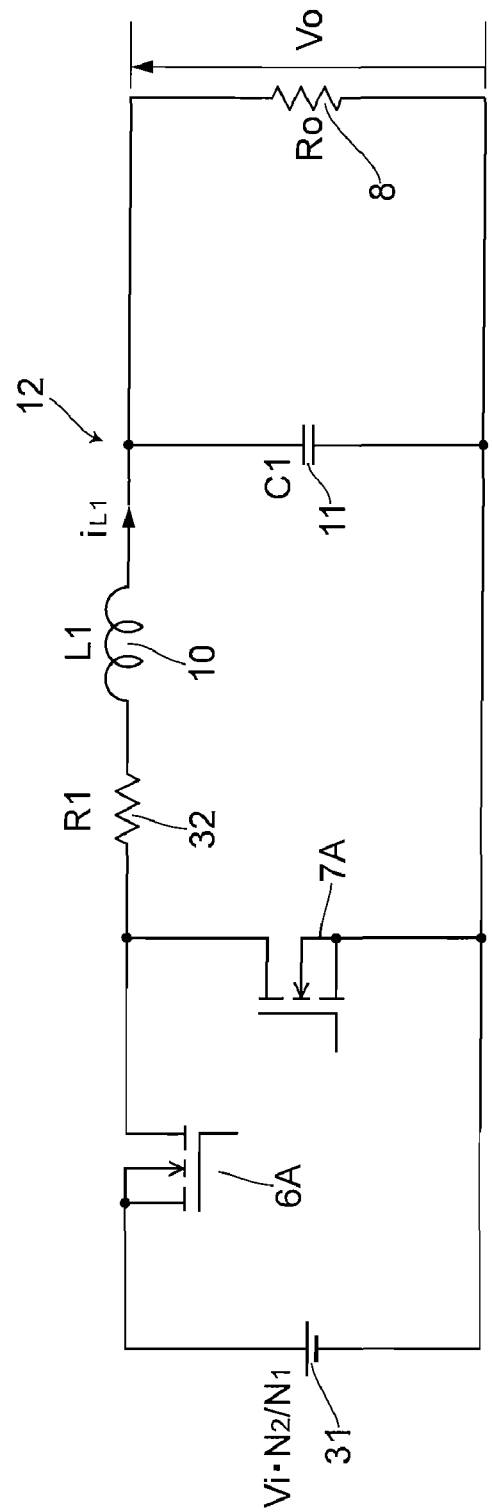
FIG. 3 is an equivalent circuit diagram of a converter including an LC filter circuit in FIG. 1, according to the first embodiment of the present invention.

An inductance L1 of the choke coil 10 and the capacitance C1 of the smoothing capacitor 11 that form the LC filter circuit 12 are determined so as to lower the sensitivity of the feedback system as well as to suppress noises in synchronism with the carrier waves and switching. If a frequency of the voltage feedback signal serving as an input voltage u to DSP 19 is sufficiently smaller than a frequency of the carrier wave from the oscillator 17, a state equation of the PWM power amplifier as a control target is expressed as liner approximate equations shown in the following equation 17 in FIG. 3 representing an equivalent model circuit of the converter section 2 including the LC filter circuit 12.

$$\dot{x} = Ax + Bu \qquad \text{Equation 17}$$

$$y = Cx$$

where $$x = \begin{bmatrix} Vo \\ i_{L1} \end{bmatrix} \quad A = \begin{bmatrix} \frac{-1}{Ro \cdot C1} & \frac{1}{C1} \\ \frac{-1}{L1} & \frac{-R1}{L1} \end{bmatrix}$$

$$B = \begin{bmatrix} 0 \\ K_p/L1 \end{bmatrix} \quad C = \begin{bmatrix} 1 & 0 \end{bmatrix}$$

In the above equation and in the equivalent circuit of FIG. 3, numeral 31 denotes an equivalent power source, taking the input voltage Vi of the DC power source 1 shown in FIG. 1 and the turn ratio N2/N1 of the transformer 3 into consideration. Numerals 6A, 7A denote rectification and commutation FETs, respectively that fulfill functions equivalent to the rectifying diode 6 and free-wheeling diode 7. Switching pulses that are synchronous with the switching element 5 and inverted from each other are applied to each gate of the FETs 6A, 7A. Further, numeral 32 denotes a combined resistance including a resistance of the choke coil 10 and on resistances of the FETs 6A, 7A or the like. Here, a resistance value of the combined resistance 32, a coil current flowing through the choke coil 10 and a resistance value of the load 8 are indicated as R1, iL1, Ro, respectively.

In cases where the digital controller incorporated in the feedback system is realized by DSP 19, due to an operating time of DSP 19 itself and conversion time for AD and DA conversions, there exists a lag time elapsing from a starting point of sampling to a point for outputting a manipulated variable. Further, triangle-shaped carrier waves are digitally converted into stepwise waveforms at the time of input to a comparator (the controller 25), thus causing a substantial lag time as compared to a comparator of an analogous controller. Here, denoting a sampling period and the sum of the lag time as T and L, respectively, the lag time L (L≦T, i.e., L is not more than T) is considered to be equivalent to an input dead time. Furthermore, in this case, since the current feedback obtained by detecting the load current is converted into the voltage feedback, one period lagged elements are combined to configure the digital control system shown in FIG. 4 and this digital control system is considered to be a new control target.

Figure 4:
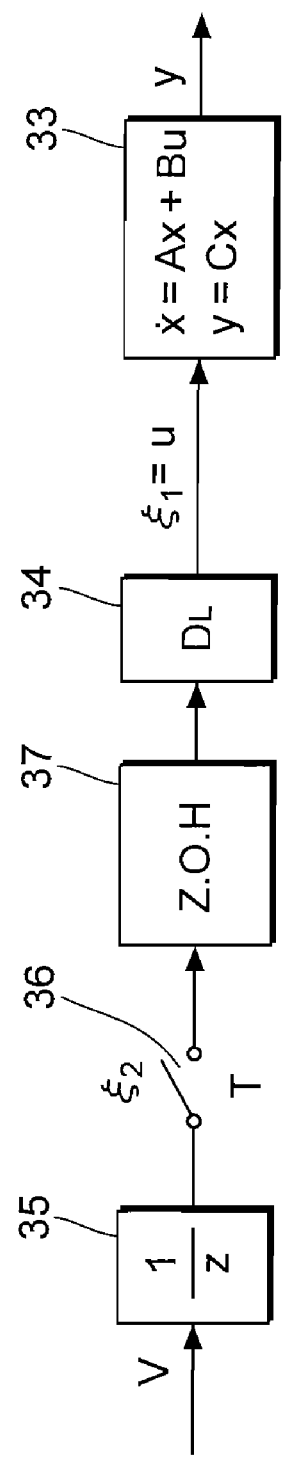
FIG. 4 is a block diagram representing a control target with an input dead time and one period time-lag component, according to the first embodiment of the present invention.

In FIG. 4, numeral 33 denotes a transfer element to which the state equation 17 mentioned above is applied and an input u is a voltage level of the voltage feedback signal, while an output y denotes the output voltage Vo. Then, numeral 34 denotes a transfer element corresponding to the sum of lag time L, while numeral 35 denotes a transfer element of an input v corresponding to the conversion from the current feedback to the voltage feedback. A time-lag of the transfer element 34 is $\xi_1$ (=u) and a time-lag of the transfer element 35 is $\xi_2$. In addition, numeral 36 denotes an equivalent switch element representing the sampling and then numeral 37 denotes a zero-order hold block for holding a constant value during the sampling period. FIG. 4 expresses the control targets (a PWM generator 26, the electric power conversion circuit 2 and the LC filter circuit 12) as a discrete time system whose order is higher by second order than a continuous-time system.

While considering the time-lags $\xi_1$, $\xi_2$ of the digital control system shown in FIG. 4, when the foregoing state equation is discretized and rewritten, the state equation is expressed as follows:

When setting as, Equation 18

$x_d = [x \ \xi]^T$, $x_d(k+1) = A_d x_d(k) + B_d v(k)$ $y(k) = C_d x_d(k)$ are obtained, where $$A_d = \begin{bmatrix} e^{AT} & \int_{T-L}^{T} e^{A\eta} b d\eta \\ 0 & 0 \end{bmatrix}$$

$$B_d = \begin{bmatrix} \int_{0}^{T-L} e^{A\eta} b d\eta \\ 1 \end{bmatrix} \quad C_d = [C \ 0]$$

where reference symbol T denotes a transposed matrix.

A change in the load 8 of the control target and a variation in the voltage of the DC power source 1 can be regarded as variations in parameter and order of the control target, as shown in the non-patent documents 1, 2. Even in the case of the discrete-time system, these variations in parameter and order of the control target can be replaced by equivalent disturbances $q_y$, $q_v$ shown in FIG. 5 from the foregoing equation 17. When saturation occurs in the input u or the frequency of the input u is not so small as compared to that of the carrier wave, the control target changes into a nonlinear system. This change in characteristic can be also replaced by the equivalent disturbances $q_y$, $q_v$ shown in FIG. 5. Accordingly, in order to make the digital controller robust (robustize the controller) by suppressing a load change, a DC power supply variation, and an influence of the change into the nonlinear system that can be considered to be the changes in parameter, the control system may be configured so as to minimize the magnitude of a pulse transfer function from the equivalent disturbances $q_y$, $q_v$ to the output y. Next is a description of a configuration and a designing method of the digital control system capable of suppressing the influences of these equivalent disturbances $q_y$, $q_v$ while preserving target characteristics.

Figure 5:
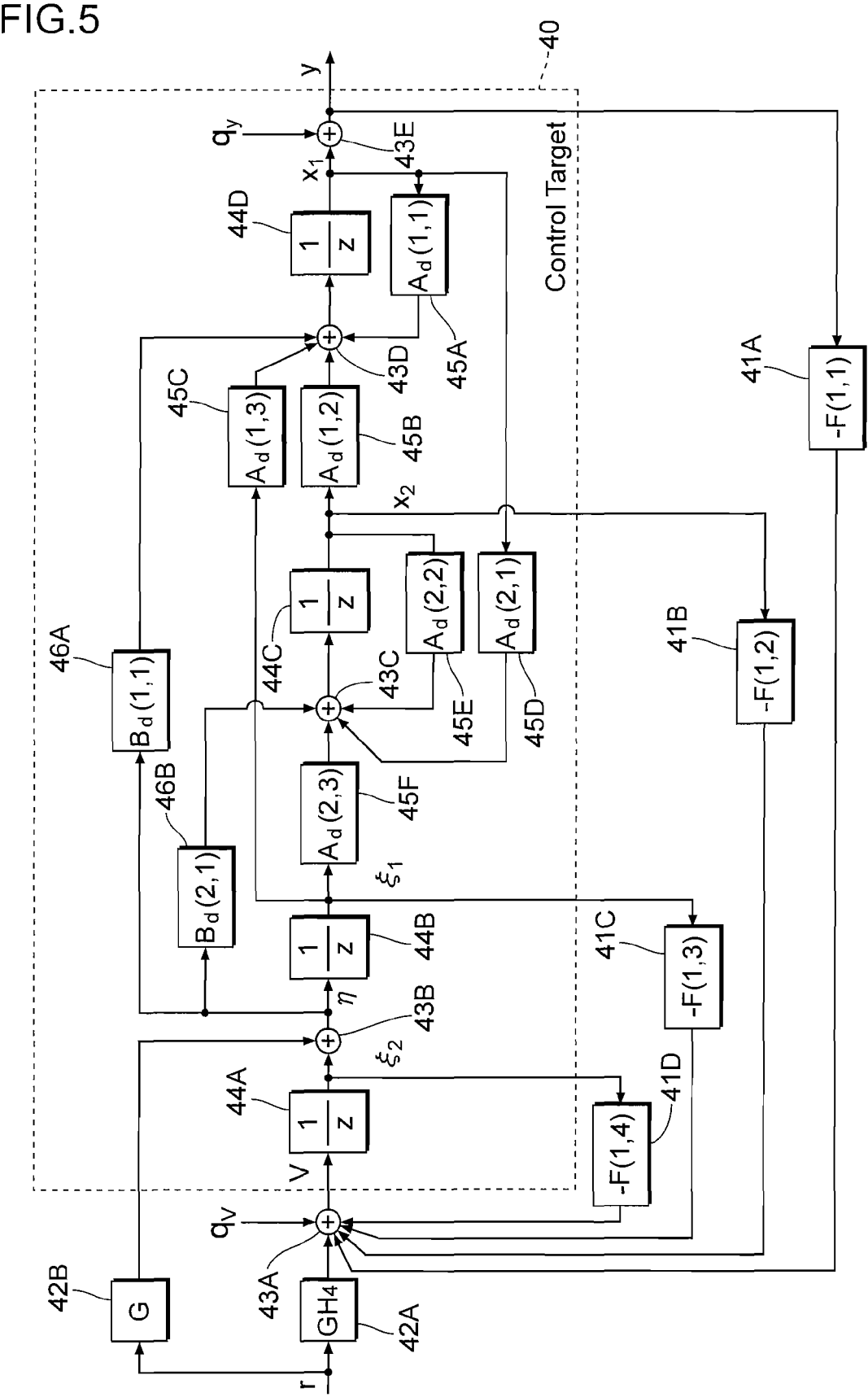
FIG. 5 is a block diagram representing a model matching system using an equivalent disturbance due to a load change and a state feedback, according to the first embodiment of the present invention.

FIG. 5 described above demonstrates a model matching system that is configured based on the foregoing state equation 17 by applying the equivalent disturbances due to the load change (a variation in parameter) and a state feedback. In FIG. 5, numerals 41A to 41D denote feedback elements for the control target 40 of the discrete-time and numerals 42A to 42B denote feedforward elements for the discrete control target 40, where a state feedback rule shown in the following equation 19 and a feedforward rule shown in the following equation 20 are applied, respectively.

$v = -Fx^* + GH_4 r$ $x^* = [yx_2 \xi_1 \xi_2]$tm Equation 19

$\xi_1(k+1) = Gr$ Equation 20

Each of the feedback elements 41A to 41D and the feedforward element 42A are input to an adding point 43A together with the equivalent disturbance $q_v$ and then its output becomes the input v shown in FIG. 4 mentioned above. In a system of a block diagram shown in FIG. 4 mentioned above, the control target 40 is configured by taking into consideration the voltage ($x_1$) feedback (the feedback element 41A), the current ($x_2$) feedback (the feedback element 41B), and the equivalent disturbance $q_y$, respectively. Here, the control target 40 is shown by the combination of elements 44A to 44D of an order 1/z, elements 45A to 45F and 46A to 46B, each of which shows elements of matrices $A_d$ and $B_d$ (the subscripts denote a row and a column), and adding points 43B to 43E, respectively. In addition, z is defined as z=exp(jωt).

From the model matching system shown in FIG. 5, in order to generate no overshoot in a step response, a transfer function $W_{ry}(z)$ between a target value r and the controlled variable y is specified as follows:

$$W_{ry} = \frac{(1+H_1)(1+H_2)(1+H_3)(z-n1)(z-n2)(z+H_4)}{(1-n1)(1-n2)(z+H_1)(z+H_2)(z+H_3)(z+H_4)} \quad \text{Equation 21}$$

where F=[F (1,1) F (1,2) F(1,3) F(1,4)] and G are determined so that the transfer function $W_{ry}(z)$ satisfies the equation 21 mentioned above when the state feedback rule of the equation 19 and the feedforward rule of the equation 20 are applied to the control target 40 in FIG. 5. In addition, n1, n2 and $H_1$ to $H_4$ that are described above are zeros and poles of the equation 18, respectively.

Figure 6:
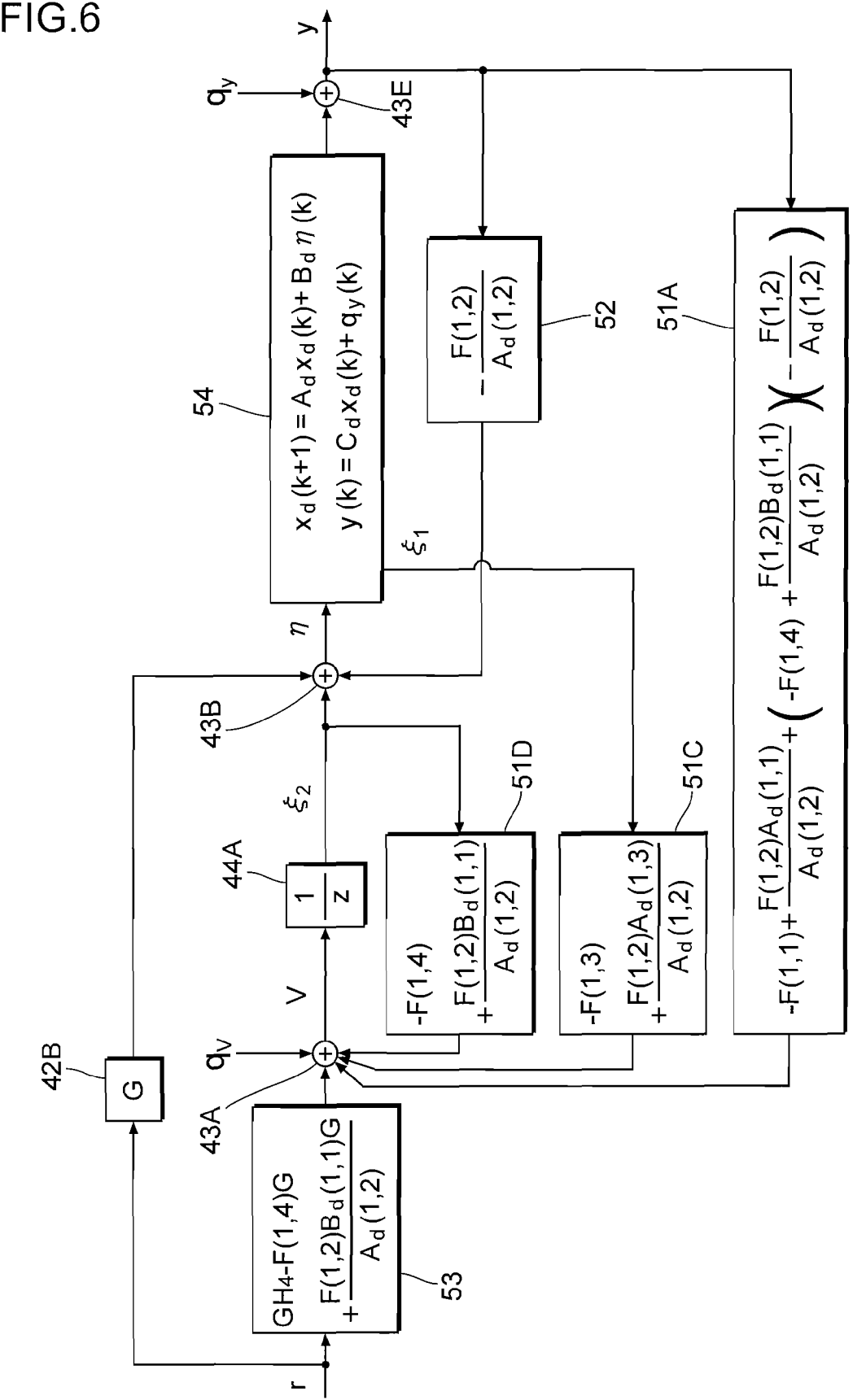
FIG. 6 is a block diagram representing a model matching system using only voltage (output) feedback, according to the first embodiment of the present invention.

Then, for the purpose of eliminating the use of an expensive current sensor and of alleviating the influence of noises, an equivalent conversion into a system using only the voltage feedback without utilizing the current feedback is performed with the transfer function $W_{ry}(z)$ between the target value r and the controlled value y unchanged. FIG. 6 demonstrates a block diagram of a model matching system using only the voltage (output) feedback. Here, combination and conversion rules are applied to the block diagram shown in FIG. 5, so that the block diagram is replaced by a circuit arrangement free from the current feedback. More specifically, the controlled variable y is input to the feedback elements 51A, 51B; a time-lag output $\xi_1$ from the element 54 of the state equation is input to the feedback element 51C; a time-lag output $\xi_2$ of the element 44A of the order 1/z is input to the feedback element 51D; and the target value r is input to the feedforward elements 42B, 53. Further, each of outputs from the first feedback elements 51A, 51C, 51D and from the first feedforward element 53 is input to the adding point 43A together with the equivalent disturbance $q_v$, and then, the output v from the adding point 43A is input to the element 44A of the order 1/z, while an output from the second feedback element 52, an output from the second feedforward element 42B, and the time-lag output $\xi_2$ from the element 44A of the order 1/z are input to another adding point 43B. An element 54 that receives an input η from the adding point 43B is constituted so as to satisfy a state equation in which the equivalent disturbance $q_v$ is deemed to be included in the equation 18 described above. Namely, the element 54 of the state equation corresponds to the power converter circuit 2 and the LC filter 12 except the digital controller comprising DSP 19.

Next, to enhance a degree of approximation as a digital controller, target characteristic to be actually realized is determined as the model $W_m(z)$ by specifying $H_1$, $H_2 \gg H_3$, which is formed by applying quadratic approximation to the foregoing pulse transfer function $W_{ry}(z)$ and is expressed as the following equation 22. The transfer function of this quadratic approximation model is a novel idea that is not disclosed even in the non-patent document 3.

$$W_{ry} \approx W_m = \frac{(1+H_1)(1+H_2)(z-n_0)}{(z+H_1)(z+H_2)(1-n_0)} \quad \text{Equation 22}$$

An equivalent disturbance Q of the system shown in FIG. 6 is defined as equation 23 and a transfer function $W_{Qy}(z)$ between the equivalent disturbance Q and the controlled variable y is defined as equation 24.

$$Q = [q_v, q_y] \quad \text{Equation 23}$$

$$W_{Qy}(z) = [W_{qvy}(z)\, W_{qyy}(z)] \quad \text{Equation 24}$$

Subsequently, in order to incorporate the model matching system shown in FIG. 4 described above into DSP 19, a system as shown in FIG. 7 is configured by introducing an inverse system (an inverse function) $W_m(z)^{-1}$ of the foregoing quadratic approximate model transfer function $W_{ry}(z)$ and a filter K (z) for approximately realizing this inverse system. Incidentally, the filter K (z) is introduced to avoid the problem that the model matching system would be an approximatively unfeasible model if the system $W_m(z)^{-1}$ is merely given. Then, the filter K (z) is expressed as the following equation 25.

$$k(z) = \frac{k_z}{z-1+k_z} \quad \text{Equation 25}$$

Figure 7:
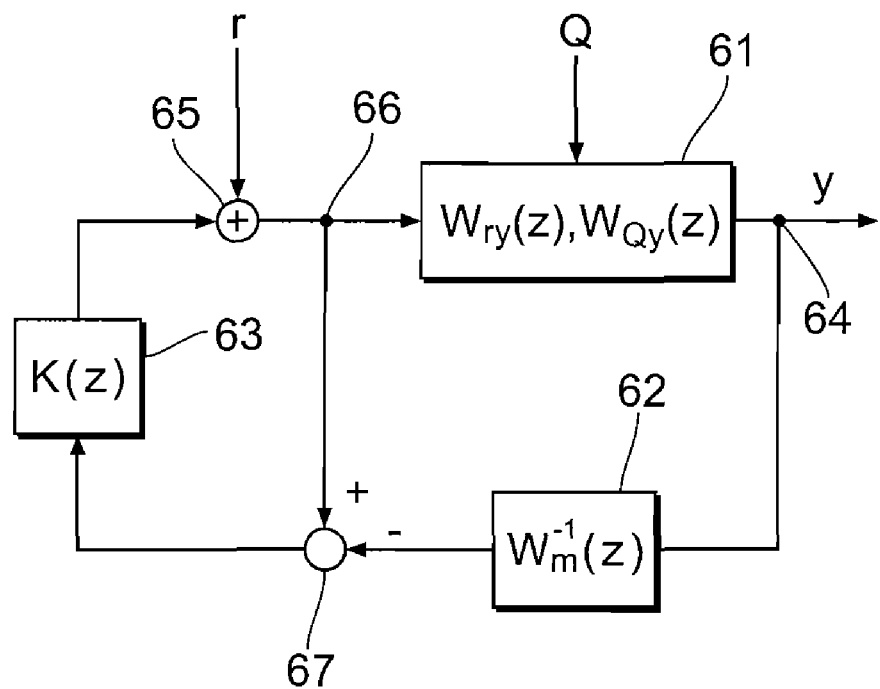
FIG. 7 is a block diagram of a feasible system in which an inverse system and a filter are connected to a system including transfer functions $W_{ry}(z)$, $W_{Qy}(z)$, according to the first embodiment of the present invention.

In FIG. 7, numeral 61 denotes a transfer element of a system including the transfer functions $W_{ry}(z)$, $W_{Qy}(z)$ that are formed by taking the equivalent disturbance Q into consideration, numeral 62 denotes a transfer element of the inverse system $W_m(z)^{-1}$ and numeral 63 denotes a transfer element serving as a robust compensator including the filter K (z). Further, in FIG. 7, the controlled variable y that is an output of the transfer element 61 is extracted at the extracting point 64 to apply this to an input of the transfer element 62, while an output from the adding point 65 adding an output of the transfer element 63 and the target value r is added to another adding point 67 through an extracting point 66 and further is input to the transfer element 61. Furthermore, the adding point 67 inputs, to the transfer element 63, a difference (a subtracted value) between the output ramified at the extracting point 66 from the adding point 65 and an output of the transfer element 62.

Figure 8:
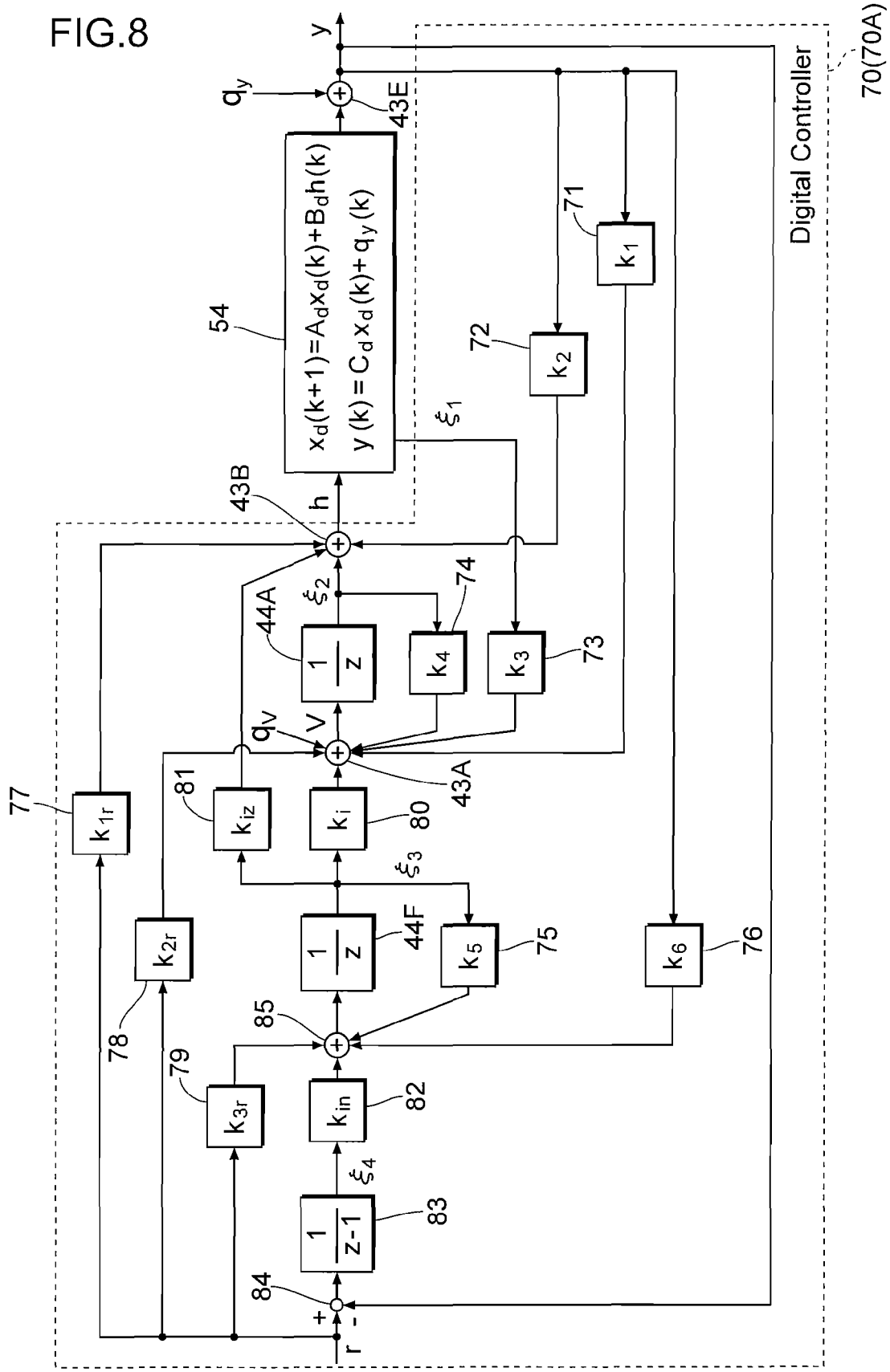
FIG. 8 is a block diagram of an approximate two-degree-of-freedom integral type digital control system obtained by equivalently converting the system shown in FIG. 7, according to the first embodiment of the present invention.

In the present embodiment, FIG. 8 is a block diagram obtained by equivalently converting the system shown in FIG. 7 into a configuration of the integral type control system capable of acting as DSP 19. Now, a description is given with respect to the configuration of the respective parts in this block diagram. Numeral 54 denotes a control target element that satisfies the following state equation 26 when an input h, a controlled variable y, a first equivalent disturbance $q_y$, and a time-lag $\xi_1$ are given respectively, with respect to an output voltage Vo and a coil current iL1 corresponding to an output current that constitutes each of elements of a matrix x. More specifically, the numeral 54 corresponds to the converter section 2 and the LC filter circuit 12. The first equivalent disturbance $q_y$ is added to an output from the control target element 54 through the adding point 43E, so that the added result is output as the controlled variable y.

$$x_d(k+1) = A_d x_d(k) + B_d h(k) \quad \text{Equation 26}$$

$$y(k) = C_d x_d(k) + q_y(k),$$

$$\text{where } x_d = [\, x \ \xi\, ]^T$$

On the other hand, part except the control target element 54 and the adding point 43E indicates a configuration of the integral type control system serving as a digital controller 70 that receives a different second equivalent disturbance $q_v$. Specifically, this system can be realized by DSP 19. The digital controller 70 comprises a combination of transfer elements 71 to 82 including parameters $k_1$, $k_2$, $k_3$, $k_4$, $k_5$, $k_6$, $k_{1r}$, $k_{2r}$, $k_{3r}$, $k_i$, $k_{iz}$, $k_{in}$, respectively; elements 44A, 44F of the order 1/z (where, z=exp(jωt)) corresponding to one sampling period time-lag; an element 83 of an order 1/z−1 or an integrator; and the adding points 43A, 43B, 84, 85. As shown in FIG. 8, feedforward elements 77, 78, 79 of parameters $k_{1r}$, $k_{2r}$, $k_{3r}$ are connected with the target value r given as an input; feedback elements 71, 72, 76 of parameters $k_1$, $k_2$, $k_6$ are connected with the controlled variable y given as an input; a feedback element 73 of the parameter $k_3$ is connected with a time-lag output $\xi_1$ that is due to an operation lag inside the digital controller 70 and is given as an input; the difference between the target value r and the controlled variable y is input from the first adding point 84 to an element 83 of the order 1/z−1; a time-lag output $\xi_4$ from the element 83 of the order 1/z−1 is input to the element 82 of the parameter $k_{in}$; an output from the element 82 of the parameter $k_{in}$, an output from each of the feedback elements 75, 76 of the parameters $k_5$, $k_6$ and an output from the feedforward element 79 of the parameter $k_{3r}$ are respectively added at the second adding point 85; the added output at the second adding point 85 is output to a first element 44F of the order 1/z; the time-lag output $\xi_3$ from the first element 44F of the order 1/z is input to the feedback element 75 of the parameter $k_5$ and to elements 80, 81 of parameters $k_i$, $k_{iz}$, respectively; outputs from the element 80 of the parameter $k_i$, from each of feedback elements 71, 73, 74 of the parameters $k_1$, $k_3$, $k_4$, from a feedforward element 78 of the parameter $k_{2r}$, and the second equivalent disturbance $q_v$ are respectively added at a third adding point 43A; an output v added at the third adding point 43A is output to a second element 44A of the order 1/z; a time-lag output $\xi_2$ from the second element 44A of the order 1/z, an output from a feedback element 72 of the parameter $k_2$, an output from a feedforward element 77 of the parameter $k_{1r}$, and an output from the element 81 of the parameter $k_{iz}$ are each added at a fourth adding point 43B; a time-lag output $\xi_2$ from the second element 44A of the order 1/z is input to the feedback element 74 of the parameter $k_4$; and an output added at the fourth adding point 43B is given to the control target element 54 as the input h described above. Thus, the control compensating means 70A of the digital controller 70 is configured.

The above-mentioned parameters $k_1$, $k_2$, $k_3$, $k_4$, $k_5$, $k_6$, $k_{1r}$, $k_{2r}$, $k_{3r}$, $k_i$, $k_{iz}$, $k_{in}$ have the following roles, respectively, which are expressed as equations 27, respectively.

$k_1$, $k_2$: voltage feedback coefficients to equivalently replace the current feedback by the voltage feedback and the control input feedback to thereby realize a model matching system of target characteristics.

$k_3$: a voltage feedback coefficient to equivalently replace the current feedback by the voltage feedback and the control input feedback to thereby compensate time-lags caused by the operation time of DSP 19 and the AD conversion time.

$k_4$: a pole of the dynamic compensator (the filter 63) introduced in order to equivalently replace the current feedback by the voltage feedback and the control input feedback.

$k_5$: a zero added to the quadratic approximate model $W_m(z)$ for enhancing a degree of approximation.

$k_6$: a voltage feedback coefficient for compensating a zero added to quadratic approximate model $W_m(z)$ for enhancing a degree of approximation.

$k_i$, $k_{iz}$: coefficients for eliminating a part of the model matching system of the target characteristics.

$k_{in}$: a coefficient representing effects due to a pole of the transfer function $W_{Qy}(z)$ between the equivalent disturbance Q and the controlled value y and due to a zero added to the quadratic approximate model $W_m(z)$.

$k_{1r}$, $k_{2r}$: coefficients of the feedforward from the target value r for establishing a numerator polynomial in order to realize the model matching system of the target characteristics.

$k_{3r}$: a coefficient of the feedforward from the target value r for approximately eliminating, from the target characteristics, a pole of the transfer function $W_{Qy}(z)$ between the equivalent disturbance Q and the controlled variable y.

$$k_1 = -F(1, 1) - F(1, 2)FF(1, 1) +$$
$$((-F(1, 4) - F(1, 2)FF(1, 4))(-F(1, 2)/FF(1, 2))) -$$

Equation 27

-continued
$$(GH4 + GF_z)((1 - n_0)k_z/((1 + H1)(1 + H2)))$$

$$k_2 = -F(1, 2)/FF(1, 2) - G((1 - n_0)k_z/((1 + H1)(1 + H2)))$$

$$k_3 = -F(1, 3) - F(1, 2)(FF(1, 3))$$

$$k_4 = F_z \qquad k_5 = n_0$$

$$k_6 = -(k_z(1 - n_0)(1 + H1 + H2) + n_0(1 - n_0)k_z)/$$
$$((1 + H1) * (1 + H2))$$

$$k_i = GH4 + GF_z \qquad k_{iz} = G \qquad k_{in} = k_z(1 - n_0)$$

$$k_{1r} = G \qquad k_{2r} = GH4 + GF_z \qquad k_{3r} = k_z$$

$$FF(1, 1) = -A_d(1, 1)/A_d(1, 2)$$

$$FF(1, 2) = A_d(1, 2)$$

$$FF(1, 3) = -A_d(1, 3)/A_d(1, 2)$$

$$FF(1, 4) = -B_d(1, 1)/A_d(1, 2)$$

$$F_z = -F(1, 4) - F(1, 2)FF(1, 4)$$

In the configuration of the digital integral type control system shown in the foregoing FIG. 8, the transfer characteristic between the target value r and controlled variable y is expressed as follows:

$$y = \frac{(1 + H_1)(z + H_2)}{(z + H_1)(z + H_2)} \frac{z - 1 - k_z}{z - 1 + k_z(-1 + W_s(z))} W_s(z) r \qquad \text{Equation 28}$$

where $W_s(z)$ is expressed as the following equation 29.

$$W_s(z) = \frac{(1 - n_0)(1 + H_3)(z - n_1)(z - n_2)}{(z - n_0)(z + H_3)(1 - n_1)(1 - n_2)} \qquad \text{Equation 29}$$

Further, the transfer characteristic between the equivalent disturbance Q and the controlled variable y is expressed as the following equation 30:

$$y = \frac{z - 1}{z - 1 - k_z} \frac{z - 1 - k_z}{z - 1 + k_z W_s(z)} W_{Qy} Q \qquad \text{Equation 30}$$

where $W_{Qy}(z)$ is expressed as the following equation 31.

$$W_{Qy}(z) = [W_{q_y y}(z) W_{q_y y}(z)] \qquad \text{Equation 31}$$

Then, if $W_s(z)$ shown in the foregoing equation 29 approximates a unity as shown in the following equation 32, the transfer characteristics shown in the equations 28, 30 are each approximated as the equations 33, 34.

$$W_s(z) = \frac{(1 - n_0)(1 + H_1)(z - n_1)(z - n_2)}{(z - n_0)(z + H_3)(1 - n_1)(1 - n_2)} \approx 1 \qquad \text{Equation 32}$$

$$y \approx \frac{(1 + H_1)(1 + H_2)}{(z + H_1)(z + H_2)} r \quad (y \approx 1 \cdot r) \qquad \text{Equation 33}$$

$$y \approx \frac{z - 1}{z - 1 - k_z} W_{Qy} Q \quad (y \approx 0 \cdot Q) \qquad \text{Equation 34}$$

Ideally, the digital controller 70 shall be incorporated so that the transfer function between the target value r and the controlled variable y becomes a unity in a necessary frequency band as shown in the parenthesis of the equation 33, and further the transfer function between the equivalent disturbance Q and the controlled variable y becomes zero in a necessary frequency band as shown in the parenthesis of the equation 34.

Figure 9:
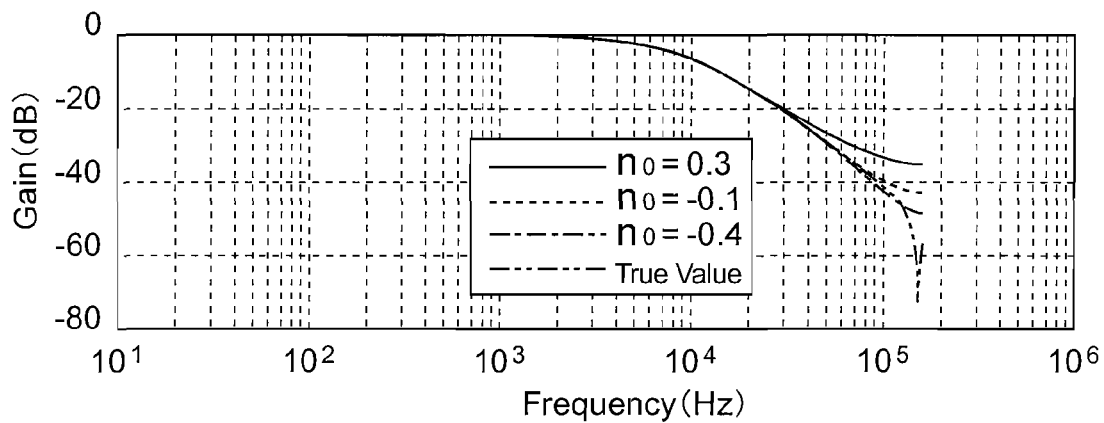
FIG. 9 is a frequency-gain characteristic diagram in a case of approximating $n_0$ to one of zeros in the system shown in FIG. 8, according to the first embodiment of the present invention.
Figure 10:
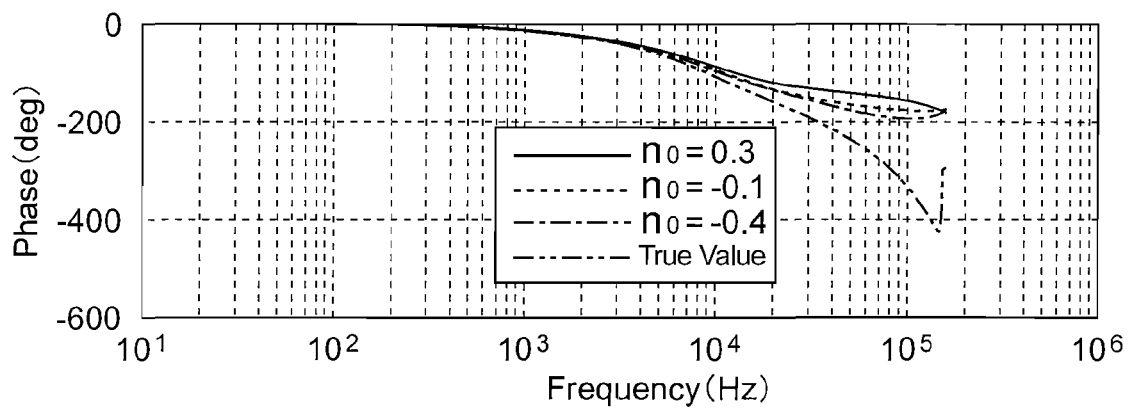
FIG. 10 is a frequency-phase characteristic diagram at the time of approximating $n_0$ to one of zeros in the system shown in FIG. 8 in the same.

According to the foregoing equations 33, 34, the novel system shown in FIG. 8 becomes an approximate two-degree-of-freedom system in which a characteristic between the target value r and the controlled variable y is determined by the poles $H_1$, $H_2$, while a characteristic between the equivalent disturbance Q and the controlled variable y is determined by $K_z$. To enhance the degree of approximation of these characteristics between these values, variable and disturbance, the equation 32 may be satisfied over a wide range of frequencies. To that end, it is necessary to set $H_3$ as small as possible and besides to bring $n_0$ close to one of zeros as near as possible. Aspects of the degree of approximation upon bringing $n_0$ close to the one of the zeros are demonstrated in a frequency-gain characteristic diagram in FIG. 9 and in a frequency-phase characteristic diagram in FIG. 10, respectively. In the figures, it can be understood that the approximate model is approximating to the equation 21 to enhance the degree of approximation upon bringing $n_0$ close to the one of the zeros. This no becomes a pole of the inverse system $W_m(z)^{-1}$ and so the larger the $K_z$, the closer and closer to one of the zeros, the no becomes. If $n_0$, however, becomes too close to one of the zeros, rapid oscillation occurs in a control input to be likely to yield uncontrollability. Consequently, in order not to make $n_0$ too close to one of the zeros, it is necessary to establish a value of the transferred $n_0$ in relation to a preliminarily given $k_z$.

Specifically, in the foregoing equations 28, 30, one of the roots for the equations, which becomes a denominator's polynomial shown in the following equation 35, result in a zero is a pole of $n_0$ that transfers as making $k_z$ larger. Hence, $n_0$ and $H_3$ may be respectively determined so that the transferring pole becomes a predetermined value.

$$\Delta(z) = z - 1 + k_z W_s(z) = 0 \quad \text{Equation 35}$$

The equation 35 can be transformed into the following equation 36.

$$\Delta(z) = (1 - n_1)(1 - n_2)(z - 1)(z + (-n_0))(z + H_3) + k_z(1 + (-n_0))(1 + H_3)(z - n_1)(z - n_2) \quad \text{Equation 36}$$

To determine undetermined values $n_0$ and $H_3$ contained in the foregoing equation 36, roots of the equation 36 are specified as the following equation 37.

$$\Delta_s(z) = (z - p1)(z - p2)(z - p3) \quad \text{Equation 37}$$
$$= z^3 + (-p1 - p3 - p2)z^2 + (p1p3 + p1p2 + p2p3)z - p1p2p3$$

Coefficient equality expressions of the foregoing equations 36, 37 can be transformed into the following equations 38 to 40.

$$(-n_1(-n_0) - n_2(-n_0) + H_3 n_1 n_2 - n_2 H_3 - H_3 n_1 + k_z(-n_0)H_3 + n_1 n_2(-n_0) + k_z - 1 - n_1 n_2 + k_z(-n_0) + H_3 + n_1 + n_2 + k_z H_3 + (-n_0))/ (1 - n_2 - n_1 + n_1 n_2) = -(p1 + p3 + p2) \quad \text{Equation 38}$$

$$(-k_z n_1(-n_0) - k_z n_2(-n_0)H_3 - H_3 n_1 n_2 + (-n_0)H_3 + n_1 n_2(-n_0)H_3 + H_3 n_1 - n_2(-n_0)H_3 - H_3 - k_z n_1 H_3 - k_z n_2 H_3 - k_z n_2(-n_0) - k_z n_1 - k_z n_2 - n_1(-n_0)H_3 - n_1 n_2(-n_0) + n_2(-n_0) + n_2 H_3 + n_1(-n_0) - (-n_0) - k_z n_1(-n_0)H_3 / (1 - n_2 - n_1 + n_1 n_2) = p1p3 + p1p2 + p2p3 \quad \text{Equation 39}$$

$$(k_z n_1 n_2(-n_0) - (-n_0)H_3 + k_z H_3 n_1 n_2 + k_z n_1 n_2(-n_0)H_3 + n_2(-n_0)H_3 + n_1(-n_0)H_3 - n_1 n_2(-n_0)H_3 + k_z n_1 n_2)/ (1 - n_2 - n_1 + n_1 n_2) = -p1p2p3 \quad \text{Equation 40}$$

As an example, in the equations 38 to 40, specified values of $p_1$, $p_2$, $p_3$ and $n_1$, $n_2$, $k_z$ are set as the following equations 41.

$$p1 = 0.485 + 0.624i \; p2 = 0.485 - 0.624i \; p3 = -0.67$$

$$k = 0.6 \; n_1 = -0.97351 \; n_2 = -0.97731e6 \quad \text{Equation 41}$$

Substitution of the conditions of the foregoing equation 41 into the equations 38 to 40 yields the following three simultaneous equations.

$$H_3 - 0.70000 - n_0 + 0.31109e - 6 - n_0 H_3 = 0$$

$$-0.69597 H_3 - 1.3040 n_0 H_3 + 0.695973 - n_0 + 0.32933 = 0$$

$$-0.29597 n_0 + 0.70403 n_0 H_3 + 0.29597 H_3 - 0.12251 = 0 \quad \text{Equation 42}$$

Since any of $n_0$ and $H_3$ is a real number, substitution of $-n_0$ and $H_3$ into the equation 42 gives the following equations 43.

$$y - 0.70000 + x + 0.31109e - 6xy = 0$$

$$-0.69597y + 1.3040xy + 0.32933 - 0.69597x = 0$$

$$\mathbf{0.29597x} - 0.70403xy + 0.29597y - 0.12251 = 0 \quad \text{Equation 43}$$

Figure 11:
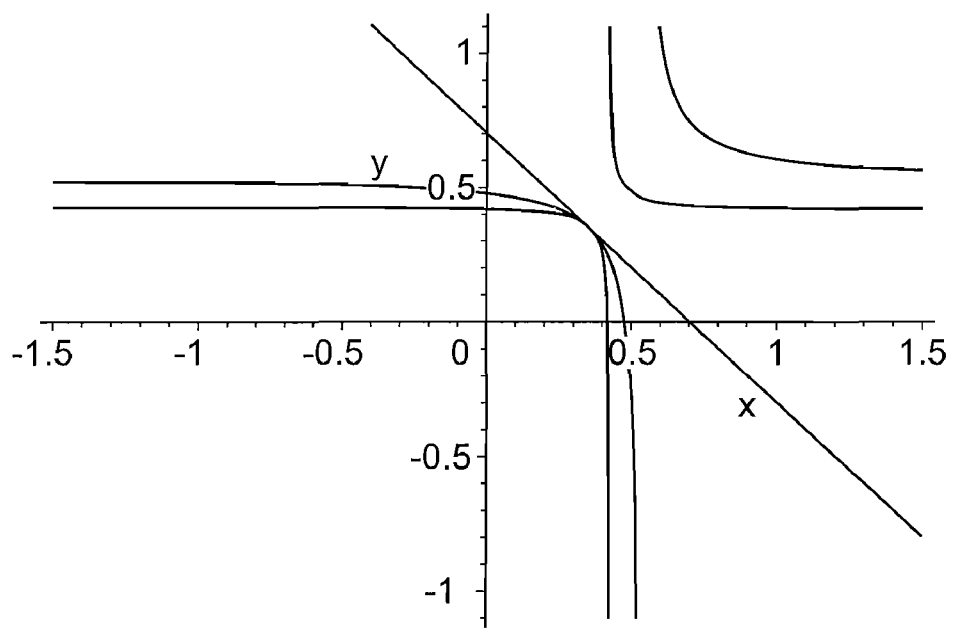
FIG. 11 is an x-y graph representing hyperbolic curves in cases where $-n_0=x$ and $H_3=y$, according to the first embodiment of the present invention.

These indicate equations of hyperbolic curves and intersecting points of each hyperbolic curve give solutions of the simultaneous equation 43. Drawing these hyperbolic curves gives FIG. 11.

From the intersecting points, $n_0 = -x = -0.4$, $H_3 = y = 0.3$ can be obtained. Setting $n_0$ and $H_3$ as these values results in transfer of $n_0$ to $p_3 = -0.67$ that has been set when $K_z = 0.6$ As a result, each parameter of the digital controller 70 shown in FIG. 8 is determined as the following equations 44 that enable the function of DSP 19 to be realized.

$$k_1 = -1090.5 \; k_2 = 527.59 \; k_3 = -0.67485$$

$$k_4 = -1.4144 \; k_i = 44.618 \; k_{iz} = -26.025 \quad \text{Equation 44}$$

Additionally, the other feedforward parameters $k_{1r}, k_{2r}, k_{3r}$ are set as zero because they are not indispensable.

Figure 12:
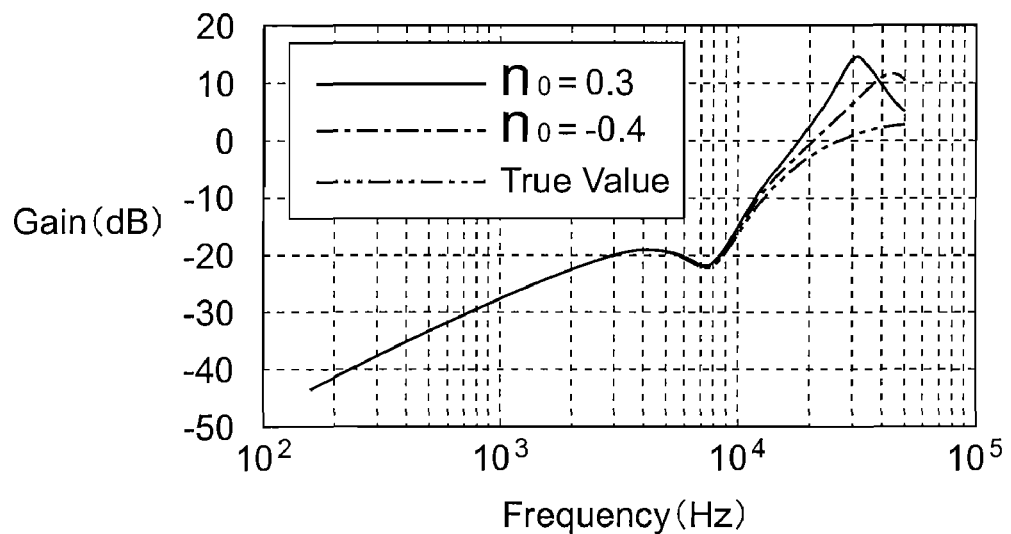
FIG. 12 is a frequency-gain characteristic diagram of a transfer function between an equivalent disturbance $q_y$ and a control variable y, according to the first embodiment of the present invention.

Next, there are shown in FIG. 12, gain characteristics of the transfer function between the equivalent disturbance $q_y$ and the controlled variable y in the previously-obtained equation 30, by using each of the parameters of the foregoing equations 44 that have been obtained by setting $n_0 = -0.4$, $H_3 = 0.3$ according to this method, shown. In FIG. 12, as bringing $n_0$ closer to one of zeros, it is appreciated that the equation 30 gets closer to a right-hand side of the equation 34 to enhance the degree of approximation.

Figure 13:
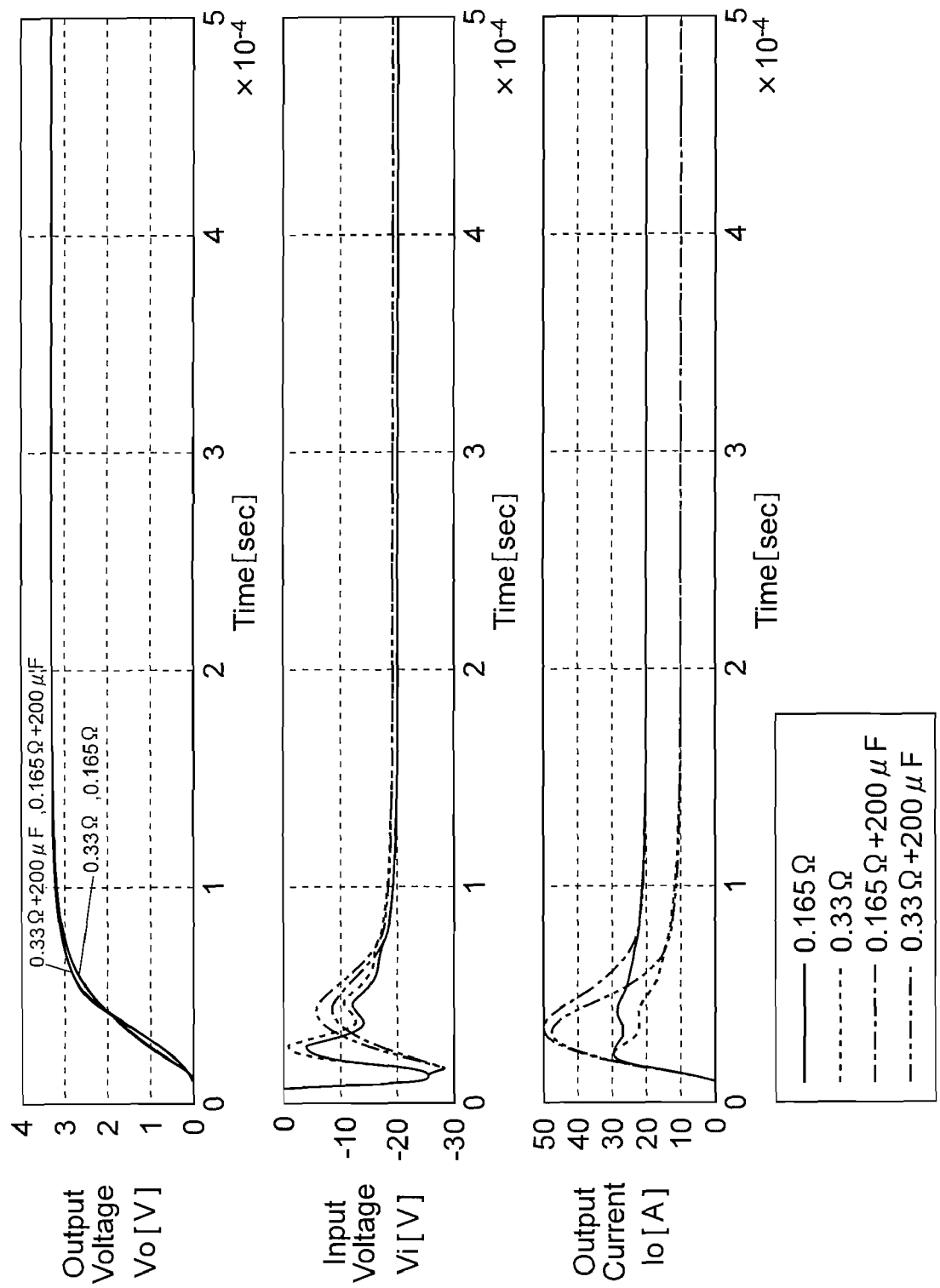
FIG. 13 is a waveform diagram representing each response characteristic of an output voltage, an input voltage and an output current on start-up, according to the first embodiment of the present invention.

FIG. 13 represents each of response characteristics of an output voltage, an input voltage, an output current on start-up.

In addition, resistance values (Ω) and capacitance values (μF) in FIG. 13 correspond to each of the values of the load 8 and smooth capacitor 11. As shown in FIG. 13, even if the load 8 varies, the response can be obtained that hardly deviates from that of a target quadratic approximation model, so that it can be appreciated that a very-low-sensitive and robust digital control system has been able to be obtained.

Figure 14:
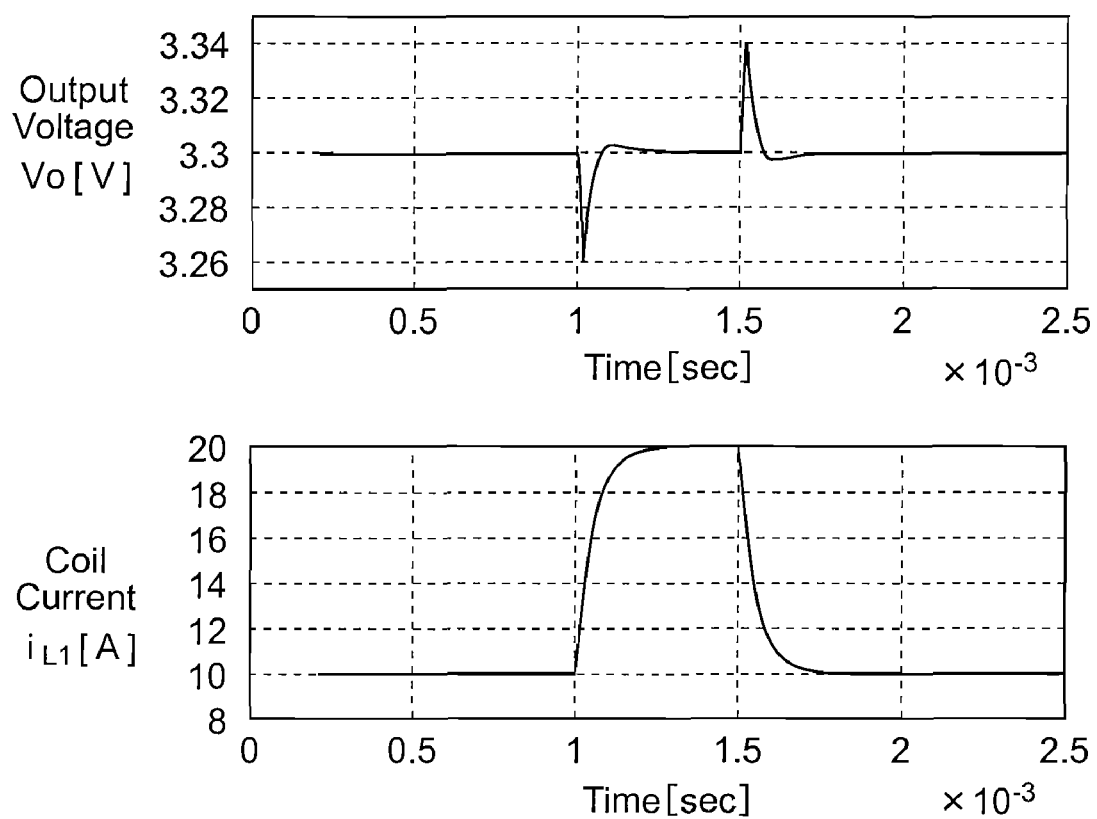
FIG. 14 is a waveform diagram representing each of a load current and output voltage that show dynamic load responses at the time of an abrupt change in load, according to the first embodiment of the present invention.

FIG. 14 shows a dynamic load response in an abrupt load change. Although the load current (coil current) is abruptly changed from 10 (A) to 20 (A), a change in the output voltage Vo is limited within 50 mV to be worthy enough for the practical use.

Then, a description is given about a design procedure for the quadratic approximation model in the present embodiment. In the first place, poles $H_1$, $H_2$ (real number constants) are set as shown the following equation 45 so as to satisfy a specified bandwidth or a specified rise time.

$$H_1 \approx H_2 \quad \text{Equation 45}$$

Next, each of the parameters $p_1$, $p_2$, $p_3$ and the parameter $k_z$ are specified as the following equations 46, 47.

$$p_1 \approx -0.5H_1 - 0.5H_1 i$$

$$p_2 \approx -0.5H_1 + 0.5H_1 i$$

$$p_3 \approx -0.5H \quad \text{Equation 46}$$

$$k_z \approx 0.5 \quad \text{Equation 47}$$

After these parameters $p_1$, $p_2$, $p_3$, $k_z$ have been specified, each of the parameters $p_1$, $p_2$, $p_3$, $k_z$ ($n_1$, $n_2$ are zeros at the time of converting the control target into a discrete-time system) is substituted into the coefficient equality expressions of the forgoing equations 38 to 40. Since both $n_0$ and $H_3$ are real numbers, by setting $-n_0 = x$ and $H_3 = y$, $n_0$ and $H_3$ are determined to satisfy the simultaneous equations of the equations 38 to 40. Software for expressing functions may be utilized for the calculation of $n_0$ and $H_3$.

Then, by using the foregoing equations 27, there is determined each of the parameters $k_1$, $k_2$, $k_3$, $k_4$, $k_5$, $k_6$, $k_{1r}$, $k_{2r}$, $k_{3r}$, $k_i$, $k_{iz}$, $k_{in}$ that constitute the digital controller 70 shown in FIG. 8. In the process of calculating these parameters, it is necessary to determine each of values of the state feedback $F = [F(1,1)\ F(1,2)\ F(1,3)\ F(1,4)]$ and feedforward G. These values can be, however, calculated by known circuit constants of the PWM power amplifier (the inductance L1 of the choke coil 10, the capacitance C1 of the smooth capacitor, the resistance value Ro of the load 8, and the resistance value R1 of the combined resistance 32), a sampling period T, the sum L of time-lags, the gain $K_p$ of the control target 54, and the poles $H_1$, $H_2$, $H_3$.

In addition, when it has been checked by simulation or the like whether desirable specifications for the PWM power amplifier are satisfied, if not being satisfied, the parameter value $k_z$ according to the equation 47 is slightly changed and subsequently the same procedure is repeated again. Even if the specifications have not been satisfied yet, the parameter values $p_1$, $p_2$, $p_3$ according to the equation 46 are slightly changed in turn and subsequently the same procedure may be repeated again.

The digital controller 70 obtained in this way, realizes the transfer function of the quadratic approximate model as shown in the equation 22, so that there can be built the PWM power amplifier that is robust against noises in observation of its output voltage. Besides, due to capability of realizing the quadratic approximate model, the digital controller 70 in the present embodiment can be applied to various control targets other than a switching regulator. Further, according to the foregoing designing method, a robust design of the approximate two-degree-of-freedom digital controller can be easily practiced without substantially considering the magnitude of the control input. As the approximate two-degree-of-freedom digital controller 70 shown here is equal in type to a conventional integral type controller, the integral type controllers in use for various applications can be simply made robust.

As described above, the digital controller 70 in the present embodiment is equipped with the control compensating means 70A for realizing the integral type control system, as shown in FIG. 8, obtained by equivalently converting the system as shown in FIG. 7 and the control compensating means 70A is connected with a control target, e.g., the control target element 54 for satisfying the following state equation 26 when the input h, the controlled variable y, the first equivalent disturbance $q_y$, the second equivalent disturbance $q_v$ and the time-lag $\xi_1$ are given, respectively. The system shown in FIG. 7 is formed by approximating a transfer function $W_{ry}(z)$ between the target value r and the controlled variable y when the state feedback rule shown in the equation 19 and the feedforward rule shown in the equation 20 are applied to the control target element 54 to determine the quadratic approximate model transfer function $W_m(z)$ as shown in the equation 22 from the quartic discrete-time system as shown in the equation 21 and then by combining the model transfer function $W_m(z)$, the inverse function $W_m(z)^{-1}$ of the model transfer function $W_m(z)$ and the filter 63 that is the dynamic compensator $K(z)$ for realizing the inverse function $W_m(z)^{-1}$.

In this case, by approximating the discrete transfer function $W_{ry}(z)$ between the target value r and the controlled variable y to the quadratic approximation model transfer function $W_m(z)$ with a higher degree of approximation, the control compensating means 70A is configured as the integral type control system capable of performing an arithmetic processing inside the digital controller 70, based on this model transfer function $W_m(z)$. Consequently, the digital controller 70 can be realized that has a higher degree of approximation and is robust against output noises as compared with the conventional approximate digital control system that realizes a first-order approximate model. Besides, a robust design of the digital controller 70 can be easily realized without substantially considering the magnitude of the control input.

Further, it is desirable that the configuration of the control compensating means 70A comprises the following elements and adding points: a feedback element 71 or a first feedback means for outputting a product of the controlled variable y and parameter $k_1$; a feedback element 72 or a second feedback means for outputting a product of the controlled variable y and parameter $k_2$; a feedback element 73 or a third feedback means for outputting a product of a first time-lag output $\xi_1$ and parameter $K_3$; a feedback element 74 or a fourth feedback means for outputting a product of a second time-lag output $\xi_2$ and parameter $k_4$; a feedback element 75 or a fifth feedback means for outputting a product of a third time-lag output $\xi_3$ and parameter $k_5$; a feedback element 76 or a sixth feedback means for outputting a product of the controlled variable y and parameter $K_6$; a first adding point 84 or a first arithmetic means for calculating the difference between the controlled variable y and the target value r; an element 83 or an integrating means for integrating the calculated value from the first adding point 84 to convert the integrated value into a fourth time-lag output $\xi_4$; an element 82 or a first integrating means for outputting a product of the fourth time-lag output $\xi_4$ from the element 83 and parameter $K_{in}$, a second adding point 85 or a first adding means for adding an output from the element 82, an output from the feedback element 75, and an output from the feedback element 76; a first element 44F of the order of 1/z or a first time-lag means for making the added result from the second adding point 85 into the third time-lag output $\xi_3$ lagged by sampling; an element 80 or a second integrating means for outputting a product of the third time-lag output $\xi_3$ and parameter $k_i$; an element 81 or a third integrating means for outputting a product of the third time-lag output $\xi_3$ and parameter $K_{i2}$; a third adding point 43A or a second adding means for adding the second equivalent disturbance $q_v$, an output from the element 80, an output from the feedback element 71, an output from the feedback element 73, and an output from the feedback element 74; a second element 44A of the order 1/z or a second time-lag means for making the added result from the third adding point 43A into the second time-lag output $\xi_2$ lagged by sampling; and a fourth adding point 43B or a third adding means for adding the output from the second element 44A, the output from the element 81, and the output from the feedback element 72 to generate the input h for the control target element 54.

Thus, the control compensating means 70A incorporated into the digital controller 70 requires no feedforward elements 77, 78, 79 or a first to a third feedforward means mentioned hereinafter, and therefore, no heavy burden is imposed on an arithmetic capacity for the digital controller 70.

Besides, it is preferable that the control compensating means 70A described here is equipped further with the feedforward means 77 or a first feedforward means for outputting a product of the target value r and parameter $k_{1r}$, the feedforward means 78 or a second feedforward means for outputting a product of the target value r and parameter $K_{2r}$, and the feedforward means 79 or a third feedforward means for outputting a product of the target value r and parameter $K_{3r}$. Thus, an output of the feedforward element 79 is further added at the second adding point 85; an output of the feedforward element 78 is further added at the third adding point 43A; and an output of the feedforward element 79 is added further at the fourth adding point 43B.

As a result, a higher-accuracy control can be realized by adding the feedforward processing networks to the control compensating means 70A.

Embodiment 2

Next is a description of a second embodiment of the present invention with reference to FIG. 15 to FIG. 22. A circuitry of a PWM power amplifier in the present embodiment is common to that of FIG. 1 shown in the first embodiment. The same reference or numerals are used for parts which are the same as in the first embodiment including these common points, and further overlapping parts are omitted as much as possible.

In the present embodiment, a first-order approximate model $W_m$ (z) including the parameter $H_1$ as shown in the following equation 48, is substituted for the quadratic approximate model including the parameters $H_1$, $H_2$ as shown in the equation 22 in the first embodiment, and is adopted as target characteristics to be practically realized. In addition, the first-order approximate model $W_m$ (z) shown in the equation 48 is also proposed in the non-patent document 3, while the model has an advantage that it is capable of simplifying a procedure of a controller since the number of the parameters is smaller than the first embodiment.

$$W_{ry}(z) \approx W_m(z) = \frac{(1 + H_1)}{(z + H_1)} \quad \text{Equation 48}$$

The equation 48 mentioned above has been derived by designing $H_2$ as $H_2 \gg H_1$, $H_3$ and approximating the transfer function $W_{ry}$ (z) shown in the equation 21 in the first embodiment. Therefore, each of the model matching systems as shown in FIGS. 5, 6 is common to that of the first embodiment.

An inverse system $W_m (z)^{-1}$ of the first-order approximate model $W_m$ (z) mentioned above and a filter K (z) for approximately realizing this inverse system are introduced to configure a system shown in FIG. 7. The filter K (z) is expressed as the foregoing equation 25. In a control system adopting the first-order approximate model $W_m$ (z) as in the present embodiment, when the system shown in FIG. 7 is equivalently converted into an integral type control system configuration capable of realizing a function of DSP 19, a block diagram is configured as shown in FIG. 15.

Figure 15:
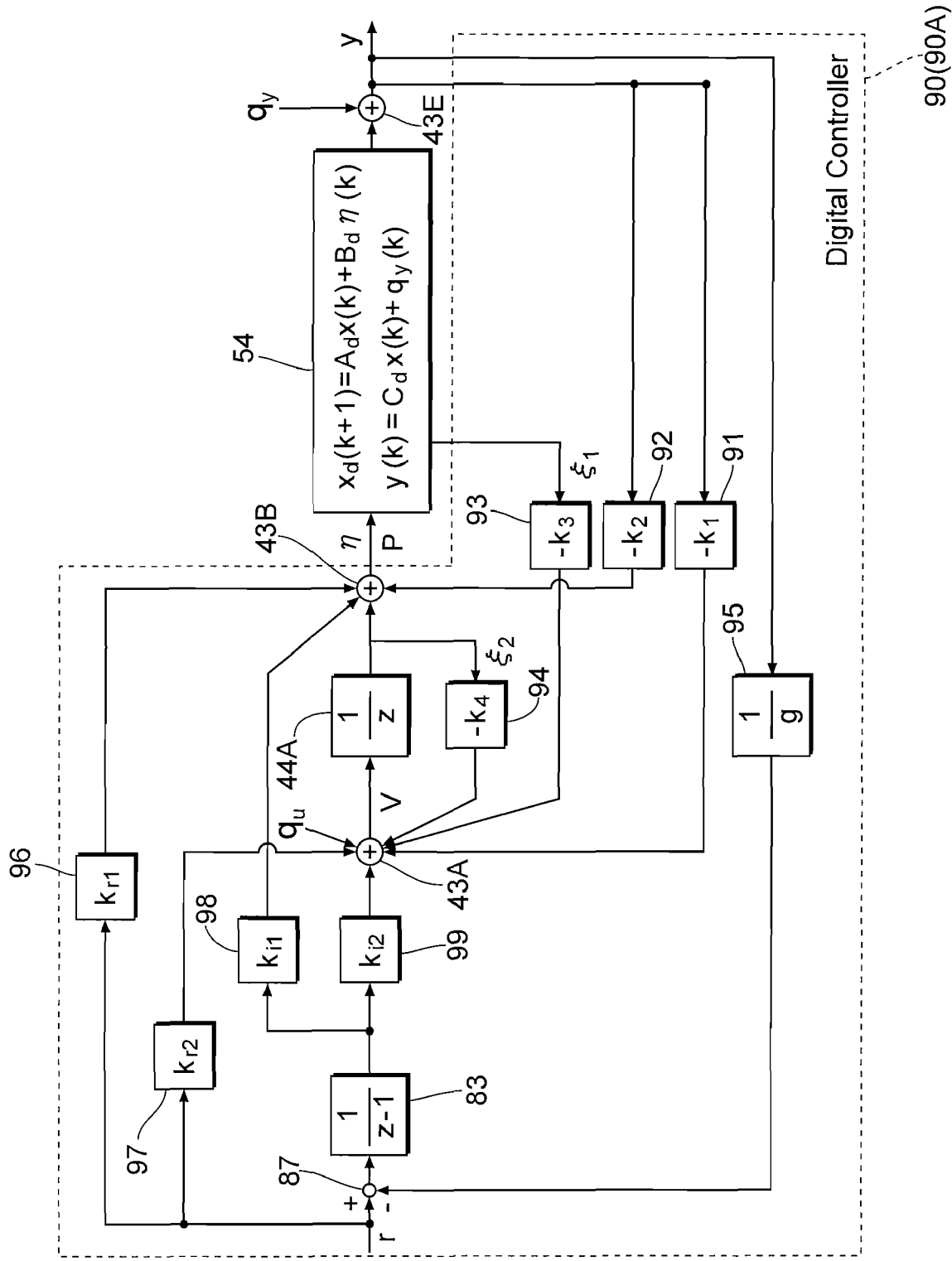
FIG. 15 is a block diagram representing an approximate two-degree-of freedom integral type digital control system, according to a second embodiment of the present invention.

In FIG. 15, numeral 54 denotes a control target element, with output voltage Vo and coil current iL1 corresponding to the output current which compose elements of a matrix x, for satisfying a state equation shown in the equation 49 when an input $\eta$, a controlled variable y, a first equivalent disturbance $q_y$, and time-lags $\xi_1$, $\xi_2$ are given, respectively. Specifically, the control target element corresponds to the converter unit 2 and the LC filter circuit 12. The first equivalent disturbance $q_y$ is added to an output from the control target element 54 through the adding point 43E and then the added result is output as the controlled variable y.

$$x_d(k+1) = A_d x_d(k) + B_d \eta(k)$$

$$y(k) = C_d x_d(k) + q_y(k),$$

$$\text{where } x_d = [x \xi]^T \quad \text{Equation 49}$$

On the other hand, parts except for the control target element 54 and the adding point 43E indicate an integral type control system acting as a digital controller 90 suffering another second equivalent disturbance $q_u$ and specifically the integral type control system is realized by DSP 19. The digital controller 90 described here comprises a combination of transmission elements 91 to 99 including each of parameters $-k_1$, $-k_2$, $-k_3$, $-k_4$, 1/g, $k_{r1}$, $k_{r2}$, $k_{i1}$, $k_{i2}$, an element 44A of an order 1/z (z=exp (jωt)) corresponding to one sampling time-lag, an element 83 of an order 1/z−1 corresponding to an integrator, and adding points 43A, 43B, 87. As shown in FIG. 15, the control compensating means 90A of the digital controller 90 may be configured as described below. Feedforward elements 96, 97 of parameters $k_{r1}$, $k_{r2}$ are connected with the target value r given as an input thereto. Each of feedback elements 91, 92, 95 of parameters $-k_1$, $-k_2$, 1/g (g is a steady-state gain introduced between the target value r and the controlled variable y) is connected with the controlled variable y given as an input thereto. A feedback element 93 of a parameter $k_3$ is connected with a time-lag output $\xi_1$ from the control target element 54 given as an input thereto. The difference between the target value r and an output of a feedback element 95 of 1/g is input to an element 83 of the order 1/z−1 from a first adding point 87. An output from the element 83 of the order 1/z−1 is input to each of elements 98, 99 of parameters $k_{i1}$, $k_{i2}$. An output from the element 99 of a parameter $k_{i2}$, an output from each of feedback elements 91, 93, 94 of parameters $-k_1$, $-k_3$, $-k_4$, an output from a feedforward element 97 of a parameter $k_{r2}$, and a second equivalent disturbance $q_u$ are respectively added at a second adding point 43A. The added output v at the second adding point 43A is input to a second element 44A of the order $1/z$. A time-lag output $\xi_2$ from the element 44A of the order $1/z$, an output from the feedback element 92 of a parameter $-k_2$, an output from a feedforward element 96 of a parameter $k_{r1}$ and an output from an element 98 of a parameter $k_{i1}$ are respectively added at a third adding point 43B. A time-lag output $\xi_2$ from the second element 44A of the order $1/z$ is input to the feedback element 94 of the parameter $-k_4$. The added output at the third adding point 43B is supplied to the control target element 54 as the input $\eta$.

Each of the foregoing parameters $k_1$, $k_2$, $k_3$, $k_4$, $k_{r1}$, $k_{r2}$, $k_{i1}$, $k_{i2}$ has the following roles, which are expressed as the equations 50.

$k_1$, $k_2$: voltage feedback coefficients for equivalently replacing current feedback by voltage feedback and control input feedback to realize a model matching system of target characteristics.

$k_3$: a voltage feedback coefficient for equivalently replacing the current feedback by the voltage feedback and the control input feedback to compensate a time-lag caused by an operating time of DSP 19 and an AD conversion time.

$k_4$: a pole of a dynamic compensator introduced for equivalently replacing the current feedback by the voltage feedback and the control input feedback $k_{i1}$, $k_{i2}$: coefficients for eliminating part of the model matching system of the target characteristics.

$k_{r1}$, $k_{r2}$: feedforward coefficients from the target value r for setting a numerator's polynomial in order to realize the model matching system of the target characteristics.

$$\begin{aligned} k_1 &= F(1,1) - F(1,2)A_d(1,1)/A_d(1,2) + \\ &\quad (-F(1,4) + F(1,2)B_d(1,1)/A_d(1,2)) + \\ &\quad F(1,2)/A_d(1,2) + (GH4 + G(-F(1,4) + \\ &\quad F(1,2)B_d(1,1)/A_d(1,2)))k_z/(1+H2) \\ k_2 &= F(1,2)/A_d(1,2) + Gk_z/(1+H2) \\ k_3 &= F(1,3) - F(1,2)A_d(1,3)/A_d(1,2) \\ k_4 &= F(1,4) - F(1,2)B_d(1,1)/A_d(1,2) \\ k_{i1} &= gGk_z \\ k_{i2} &= g(GH4 + G(-F(1,4) + \\ &\quad F(1,2)B_d(1,1)/A_d(1,2)))k_z \\ k_{r1} &= gG \\ k_{r2} &= g(GH4 + G(-F(1,4) + \\ &\quad F(1,2)B_d(1,1)/A_d(1,2))) \end{aligned}$$ Equation 50

In the configuration of the integral type digital system shown in FIG. 15, a transfer characteristic between the target value r and the controlled variable y is expressed as the following equation 51.

$$y = \frac{(1+H_1)}{(z+H_1)} \frac{z-1}{z-1-k_z} \frac{z-1-k_z}{z-1+k_z(-1+W_s(z))} W_s(z) r \quad \text{Equation 51}$$

where, $W_s(z)$ is expressed as the following equation 52.

$$W_s(z) = \frac{(1+H_2)(1+H_3)(z-n_1)(z-n_2)}{(z+H_2)(z+H_3)(1-n_1)(1-n_2)} \quad \text{Equation 52}$$

Further, a transfer characteristic between an equivalent disturbance Q and the controlled variable y is expressed as the following equation 53.

$$y = \frac{z-1}{z-1-k_z} \frac{z-1-k_z}{z-1+k_z W_s(z)} W_{Qy} Q \quad \text{Equation 53}$$

where $W_{Qy}(z)$ is expressed as the following equation 54.

$$W_{Qy}(z) = [W_{q_y y}(z) W_{q_y y}(z)] \quad \text{Equation 54}$$

At this time, if the following equations 55, 56 are satisfied, the transfer characteristics shown in the foregoing equations 51, 53 is approximated by the equations 57, 58, respectively.

$$\frac{z-1}{z-1-k_z} \frac{z-1-k_z}{z-1+k_z(-1+W_s(z))} W_s(z) \approx 1 \quad \text{Equation 55}$$

$$\frac{z-1-k_z}{z-1+k_z W_s(z)} W_{Qy} \approx 1 \quad \text{Equation 56}$$

$$y \approx \frac{(1+H_1)}{(z+H_1)} r \quad \text{Equation 57}$$

$$y \approx \frac{z-1}{z-1-k_z} W_{Qy} Q \quad \text{Equation 58}$$

According to the equations 57, 58 described above, the system shown in FIG. 15 becomes a approximate two-degree-of-freedom system in which the characteristic between the target value r and the controlled variable y is determined by $H_1$ while the characteristic between the equivalent disturbance Q and the controlled variable y is determined by $k_z$. In order to enhance a degree of approximation with respect to the characteristics between them, the equations 55, 56 should be applied over a wide range of frequencies. To that end, after $k_z$ has been set, $H_2$, $H_3$, are determined so that numerator's polynomials of the equations 55, 56 may become zero, i.e., the roots of the following equation may become specified values.

$$\Delta(z) = z - 1 + k_z W_s(z) = 0 \quad \text{Equation 59}$$

To decrease the magnitude of a transfer function $W_{q_y y}(z)$ between the equivalent disturbance $q_y$ and the controlled variable y to lower the sensitivity thereof, a value of the foregoing parameter $k_z$ should be increased. As is clear from FIG. 15, however, $k_z$ is input directly to a control input and therefore exercises a great influence. Therefore, if making $k_z$ too large, the control input becomes excessive to make control input unfeasible. Consequently, to set $k_z$ as an appropriate value and then to decrease the magnitude of the transfer function $W_{q_y y}(z)$ between the equivalent disturbance $q_y$ and the controlled variable y, the equation 56 may be satisfied over a wide range of frequencies, while the magnitude of the transfer function $W_{q_y y}(z)$ may be decreased. There are explained hereinafter, one method for decreasing the magnitude of the transfer function $W_{q_y y}(z)$ and one method for satisfying the equations 55, 56 over a wide range of frequencies.

As one example of the method for decreasing the magnitude of the transfer function $W_{q_y y}(z)$, there is proposed a method in which a steady-state value $W_{q_y y}(1)$ of the transfer function is decreased. The steady-state value $W_{q_y y}(1)$ of the transfer function $W_{q_y y}(z)$ is expressed as follows:

$$W_{q_{yy}}(1) = \frac{W_n(1)}{W_d(1)}$$ Equation 60

Additionally, $W_n(1)$ and $W_d(2)$ described above are recast in the following equations.

$$W_n(1) = \begin{pmatrix} 6 + 3H_2 + 3H_1 + 3H_2 + \\ 3H_4 + H_1H_3 + H_1H_2 + H_2H_4 + \\ H_2H_3 + H_1H_4 + H_3H_4 \end{pmatrix} T^2$$ Equation 61

$$W_d(1) = L_0C_0(1+H_1)(1+H_2)(1+H_3)(1+H_4)$$

For example, when $H_1$, $H_4$, an inductance Lo (H) of the choke coil 10 constituting the LC filter 12, a capacitance Co (F) of the smoothing capacitor 11, and a sampling period T (sec) of the digital controller 90 that are indicated as in the following equations 62 are substituted into the foregoing equation 60, respectively, the steady-state value $W_{q_{yy}}(1)$ in the equation 60 can be expressed as equation 63.

$$H_1 = -0.89, H_4 = -0.3, T = 3.3 \times 10^{-6}$$ Equation 62
$$L_0 = 1.4 \times 10^{-6}, C_0 = 308 \times 10^{-6}$$

$$W_{q_{yy}}(1) = 0.32799 \frac{2.697 + 1.81H_3 + 1.81H_2 + H_2H_3}{(1+H_2)(1+H_3)}$$ Equation 63 where $H_2$, $H_3$ are defined as real numbers to set $H_2=x$, $H_3=y$ and then, $H_2$, $H_3$ are substituted into the foregoing equation 63, and thus the following equation 64 can be obtained.

$$W_{q_{yy}}(1) = \frac{0.88458 + 0.59366y + 0.59366x + 0.32799}{1 + x + y + xy}$$ Equation 64

Figure 16:
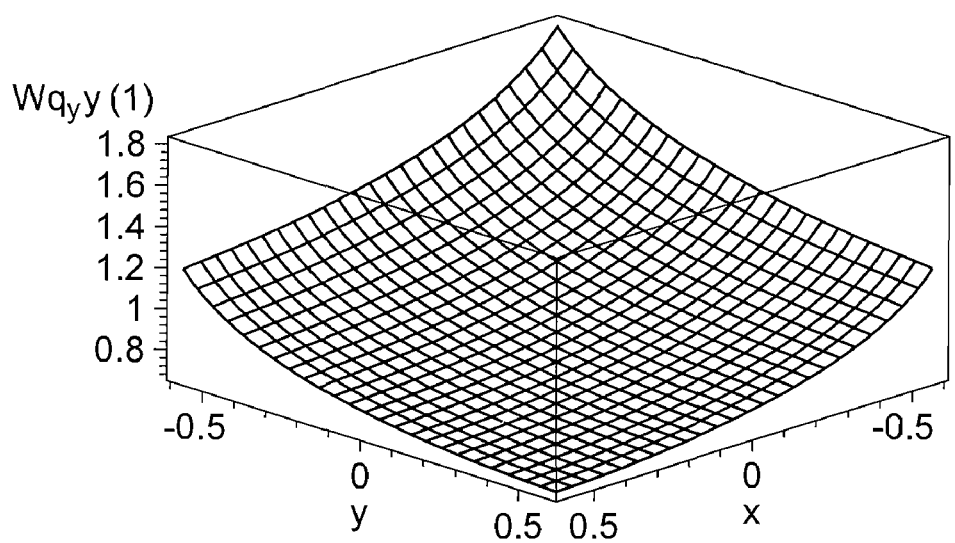
FIG. 16 is a graph relating to a steady-state value $W_{qyy}(1)$, where $H_2=x$ and $H_3=y$, according to the second embodiment of the present invention.

By plotting a graph of the equation 64 for the steady-state $W_{q_{yy}}(1)$, three-dimensional curves can be drawn as shown in FIG. 16.

Next, setting $H_2$, $H_3$ as complex numbers to be $H_2=x+yi$, $H_3=x-yi$ and then substituting them into the foregoing equation 63, the following equation 65 can be obtained.

$$W_{q_{yy}}(1) = \frac{0.88458 + 1.1873x + 0.32799x^2 + 0.32799y^2}{1 + 2x + x^2 + y^2}$$ Equation 65

Figure 17:
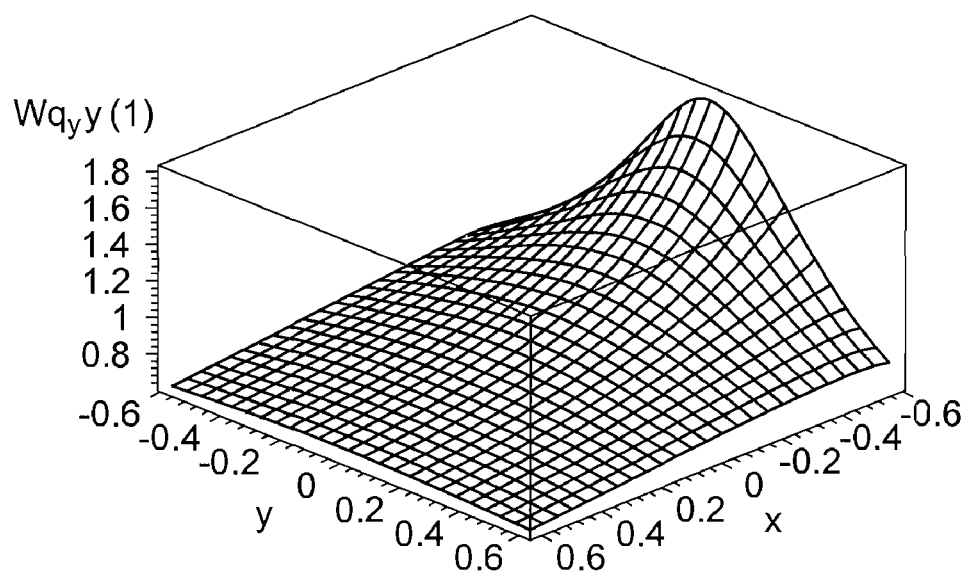
FIG. 17 is a graph relating to a steady-state value $W_{qyy}(1)$, where $H_2=x+yi$ and $H_3=x-yi$, according to the second embodiment of the present invention.
Figure 18:
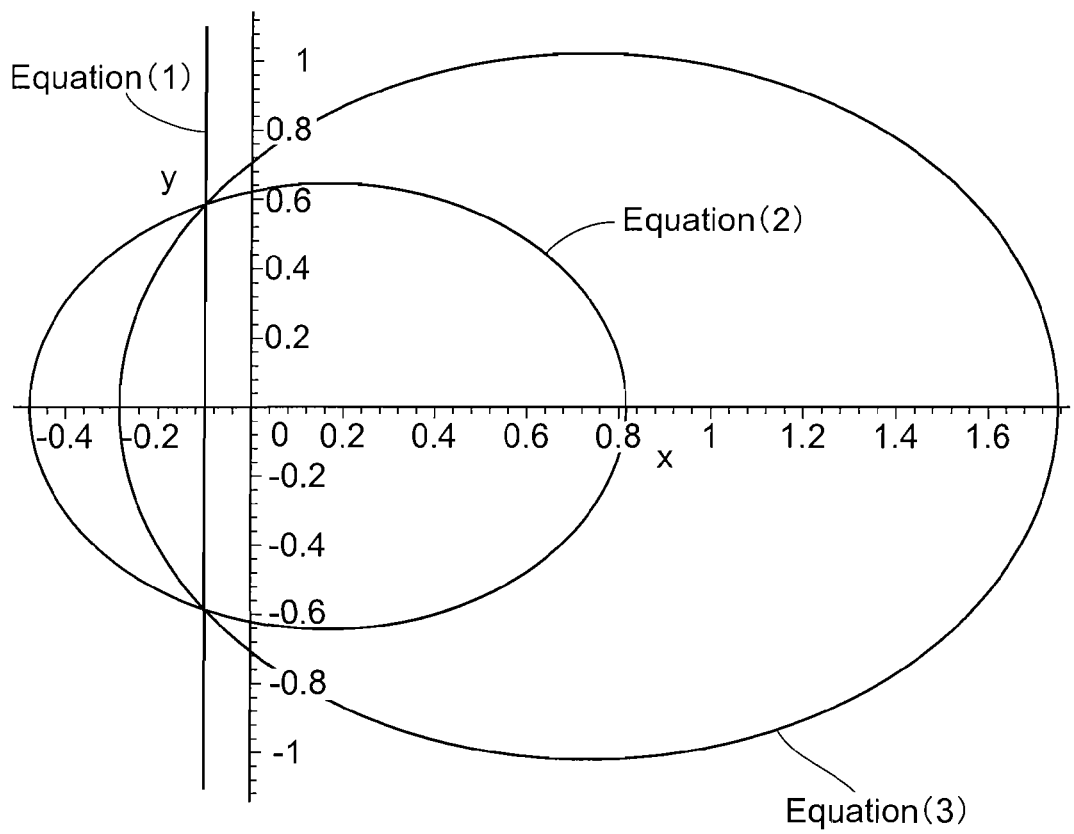
FIG. 18 is an x-y graph representing circle equation, where $H_2=x+yi$ and $H_3=x-yi$, according to the second embodiment of the present invention.

By plotting a graph of the equation 65 for the steady-state value $W_{q_{yy}}(1)$, three-dimensional curves can be drawn as shown in FIG. 17.

Comparing the graphs in FIG. 16 and FIG. 17 with each other indicates that when $H_2$, $H_3$ are set as the complex numbers, the magnitude of the steady-state value $W_{q_{yy}}(1)$ gets small over a wider range than when $H_2$, $H_3$ are determined as real numbers. Therefore, $H_2$, $H_3$ are set as the complex numbers to be $H_2=x+yi$, $H_3=x-yi$ and desirable values x and y are respectively selected from the range in which the magnitude of the steady-state value $W_{q_{yy}}(1)$ shown in FIG. 17 are smaller.

Next, a method is proposed for satisfying the equations 8, 9 over a wide range of frequencies. Here, after the parameter $k_z$ is set, $H_2$, $H_3$ may be set so that real number parts of roots of the equation shown in equation 59, e.g., the following equation 66 becomes as small as possible.

$$\Delta(z) = (1-n_1)(1-n_2)(z-1)(z+H_2)(z+H_3) + k_z(1+H_2)(1+H_3)(z-n_1)(z-n_2)$$ Equation 66 where the roots in the equation 66 are specified as the following equation 67.

$$\Delta_s(z) = (z-p1)(z-p2)(z-p3)$$ Equation 67
$$= z^3 + (-p1 - p3 - p2)z^2 + (p1p3 + p1p2 + p2p3)z - p1p2p3$$

At this time, coefficient equality expressions for the equations 66, 67 can be expressed by the following equations 68 to 70.

$$\begin{pmatrix} -n_1H_2 - n_2H_2 + H_3n_1n_2 - n_2H_3 - \\ H_3n_1 + k_zH_2H_3 + n_1n_2H_2 + \\ k_z - 1 - n_1n_2 + k_zH_2 + H_3 + \\ n_1 + n_2 + k_zH_3 + H_2 \end{pmatrix} \Big/$$ Equation 68
$$(1 - n_2 - n_1 + n_1n_2) = -(p1 + p3 + p2)$$

$$\begin{pmatrix} -k_zn_1H_2 - k_zn_2H_2H_3 - H_3n_1n_2 + H_2H_3 + \\ n_1n_2H_2H_3 + H_3n_1 - n_2H_2H_3 - H_3 - \\ k_zn_1H_3 - k_zn_2H_3 - k_zn_2H_2 - k_zn_1 - k_zn_2 - \\ n_1H_2H_3 - n_1n_2H_2 + n_2H_2 + n_2H_3 + \\ n_1H_2 - H_2 - k_zn_1H_2H_3 \end{pmatrix} \Big/$$ Equation 69
$$(1 - n_2 - n_1 + n_1n_2) = p1p3 + p1p2 + p2p3$$

$$\begin{pmatrix} k_zn_1n_2H_2 - H_2H_3 + k_zH_3n_1n_2 + k_zn_1n_2H_2H_3 + \\ n_2H_2H_3 + n_1H_2H_3 - n_1n_2H_2H_3 + k_zn_1n_2 \end{pmatrix} \Big/$$ Equation 70
$$(1 - n_2 - n_1 + n_1n_2) = -p1p2p3$$

Here, by setting $H_2=x+yi$, $H_3=x-yi$ to be substituted into the coefficient equality expressions 68 to 70, the following equations 71 to 73 can be obtained.

$$\begin{pmatrix} k_zx^2 + (2k_z - 2n_2 + 2n_1n_2 - 2n_1 + 2)x + \\ k_zy^2 + (-1 + n_2 + k_z - n_1n_2 + n_1) \end{pmatrix} \Big/$$ Equation 71
$$(1 - n_2 - n_1 + n_1n_2) = -p1 - p3 - p2$$

$$\begin{pmatrix} (-k_zn_1 + n_1n_2 - n_2 + 1 - n_1 - k_zn_2)x^2 + \\ (2n_2 + 2n_1 - 2k_zn_2 - 2n_1n_2 - 2k_zn_1 - 2)x + \\ (-k_zn_1 + n_1n_2 - n_2 + 1 - n_1 - k_zn_2)y^2 - \\ k_zn_2 - k_zn_1 \end{pmatrix} \Big/$$ Equation 72
$$(1 - n_2 - n_1 + n_1n_2) = p1p3 + p1p2 + p2p3$$

$$\begin{pmatrix} (-1 + n_2 + k_zn_1n_2 - n_1n_2 + n_1)x^2 + 2k_zn_1n_2x + \\ (-1 + n_2 + k_zn_1n_2 - n_1n_2 + n_1)y^2 + k_zn_1n_2 \end{pmatrix}$$ Equation 73
$$(1 - n_2 - n_1 + n_1n_2) = -p1p2p3$$

As an example, the specified values of $p_1, p_2, p_3$ and $n_1, n_2, k_z$ are set as the following equation 74.

$$p1=0.35+0.5i \; p2=0.35-0.5i \; p3=0.5 \; k_z=0.3$$

$$n_1=-0.97351 \; n_2=-0.97731e6$$ Equation 74

Substitution of these values into the foregoing equations 71 to 73 yields three simultaneous equations as shown in the equations 75.

$$2.0000x+0.15554e-6x^2+0.15554e-6y^2+0.20000=0$$

$$-1.6960x+1.1520x^2+1.1520y^2-0.57047=0$$

$$0.29560x-0.85201x^2-0.85201y^2+0.33423=0 \quad \text{Equation 75}$$

These equations are equations for displaying circles and intersecting points of the circles give solutions for the three simultaneous equations. Plotting these circles forms graphs shown in FIG. 18. In addition, the equations (1) to (3) denoted in FIG. 18 correspond to each of the foregoing equations 75. The intersecting points of these simultaneous equations give x=−0.1, y=0.6. Accordingly, when setting $H_2$=−0.1+0.6i, $H_3$=−0.1−0.6i, roots of the equation 59 becomes the specified values. Thus, all the poles including $H_2$, $H_3$ are determined and therefore the state feedback F=[F(1,1) F(1,2) F(1,3) F(1,4)] and G are determined, so that the parameters of the digital controller 90 in FIG. 15 can be determined as the following equation 76.

$$k_1=-332.23 \quad k_2=260.57 \quad k_3=-0.51638$$

$$k_4=-0.51781 \quad k_i=7.0594 \quad k_{iz}=-8.6321 \quad \text{Equation 76}$$

Just like the first embodiment, the other feedforward parameters $k_{r1}$, $k_{r2}$ are not necessarily required and so have been set as zero.

Figure 19:
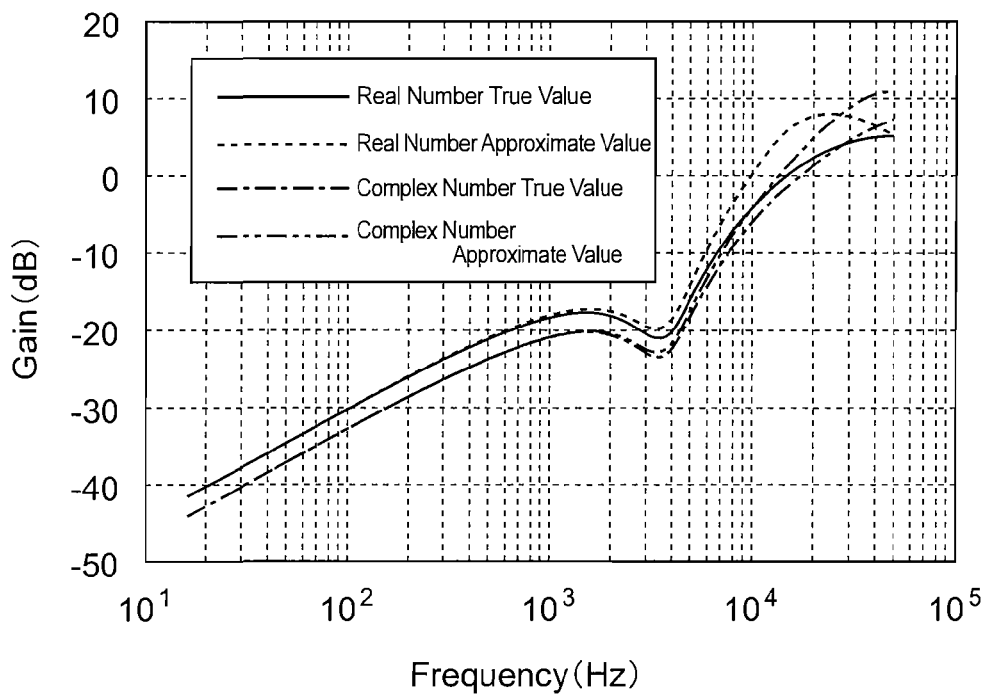
FIG. 19 is a frequency-gain characteristic diagram of a transfer function between the equivalent disturbance $q_y$ and the control variable y, according to the second embodiment of the present invention.

Next, there are shown respectively in the graph in FIG. 19: a gain characteristic of the transfer function between the equivalent disturbance $q_y$ and the controlled variable y that have been determined by the equation 53 using parameters which are the parameters of the equation 70 determined by setting $H_2$=−0.1+0.6i, $H_3$=−0.1−0.6 i as described above; and a gain characteristic of the transfer function between the equivalent disturbance $q_y$ and the controlled variable y that have been determined by the equation 53 using parameters which are the parameters of the equation 76 determined by suitably setting as $H_2$=−0.1, $H_3$=−0.2. In FIG. 19, "a complex number approximate value" means an approximate value of the gain characteristic that has been determined in the equation 53 by setting as $H_2$=−0.1+0.6i, $H_3$=−0.1−0.6i, while "a complex number true value" means a true value of the gain characteristic when the poles $H_2$, $H_3$ are set as the same complex numbers as described above. Similarly, "real number approximate value" means an approximate value of the gain characteristic that has been determined in the equation 53 by setting $H_2$=−0.1, $H_3$=−0.2, while "real number true value" means a true value of the gain characteristic when the poles $H_2$, $H_3$ are set as the same real numbers as described above. As is clear from FIG. 19, when the poles $H_2$, $H_3$ are set as the complex numbers obtained by the present method, the steady-state value of $W_{qyy}$ (1) is smaller than and the true value itself has become smaller than those when being otherwise set. Besides, it is appreciated that an approximate value of the gain characteristic is smaller as compared with cases where the poles $H_2$, $H_3$ are real numbers.

Figure 20:
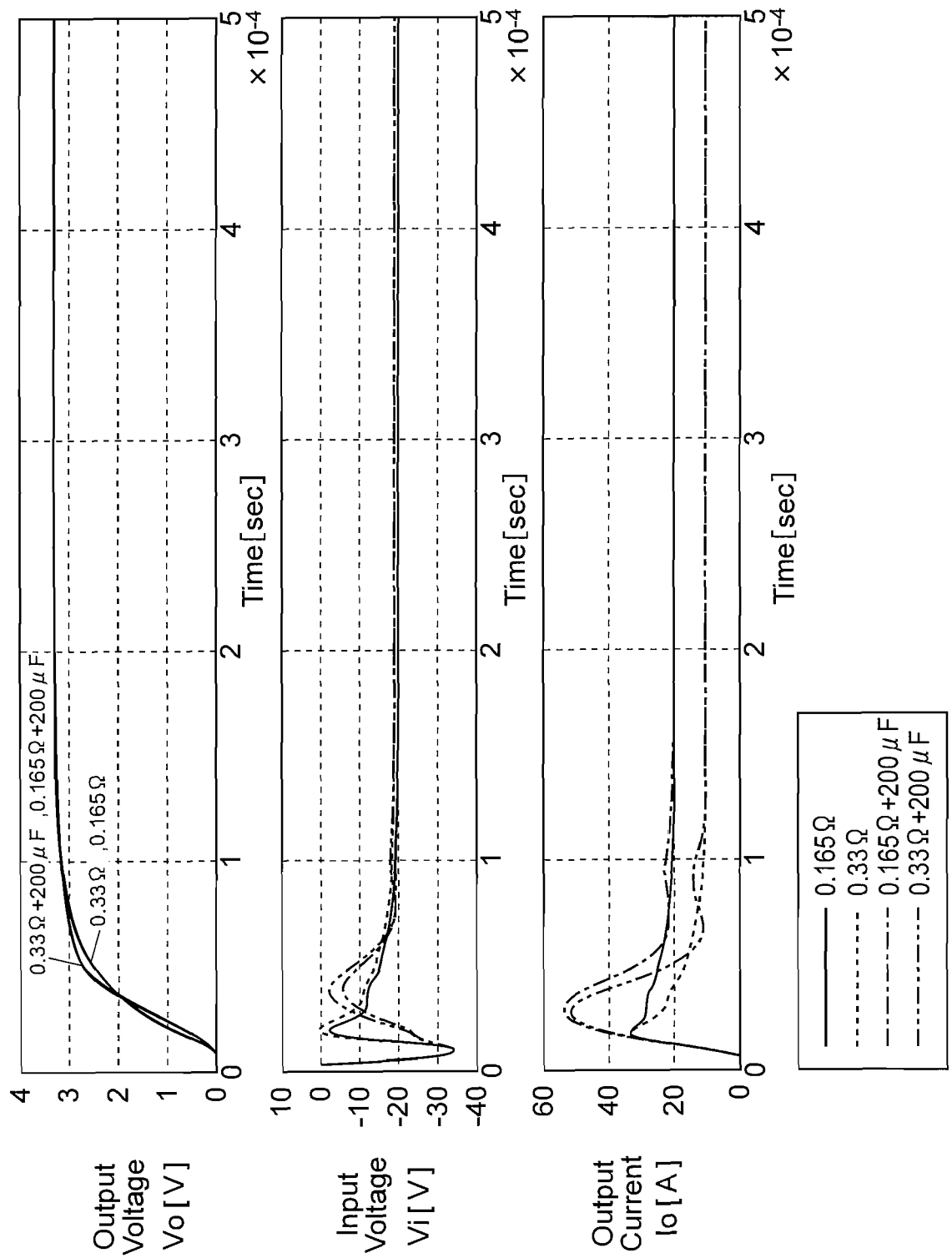
FIG. 20 is a waveform diagram representing each of response characteristics of an output voltage, an input voltage and an output current on start-up in a case of setting poles $H_2$, $H_3$ as complex numbers, according to the second embodiment of the present invention.

FIG. 20 represents start-up responses for various loads when the poles $H_2$, $H_3$ are set on the basis of the foregoing method. In addition, a resistance value (Ω) and a capacitance (μF) in FIG. 20 correspond to each value of the foregoing load 8 and smoothing capacitor 11. As is clear from FIG. 20, even if the load 8 varies, the response is such that there is substantially no displacement from that of a target first-order approximate model, so that it is appreciated that a robust digital control system with extremely low sensitivity has been obtained.

Figure 21:
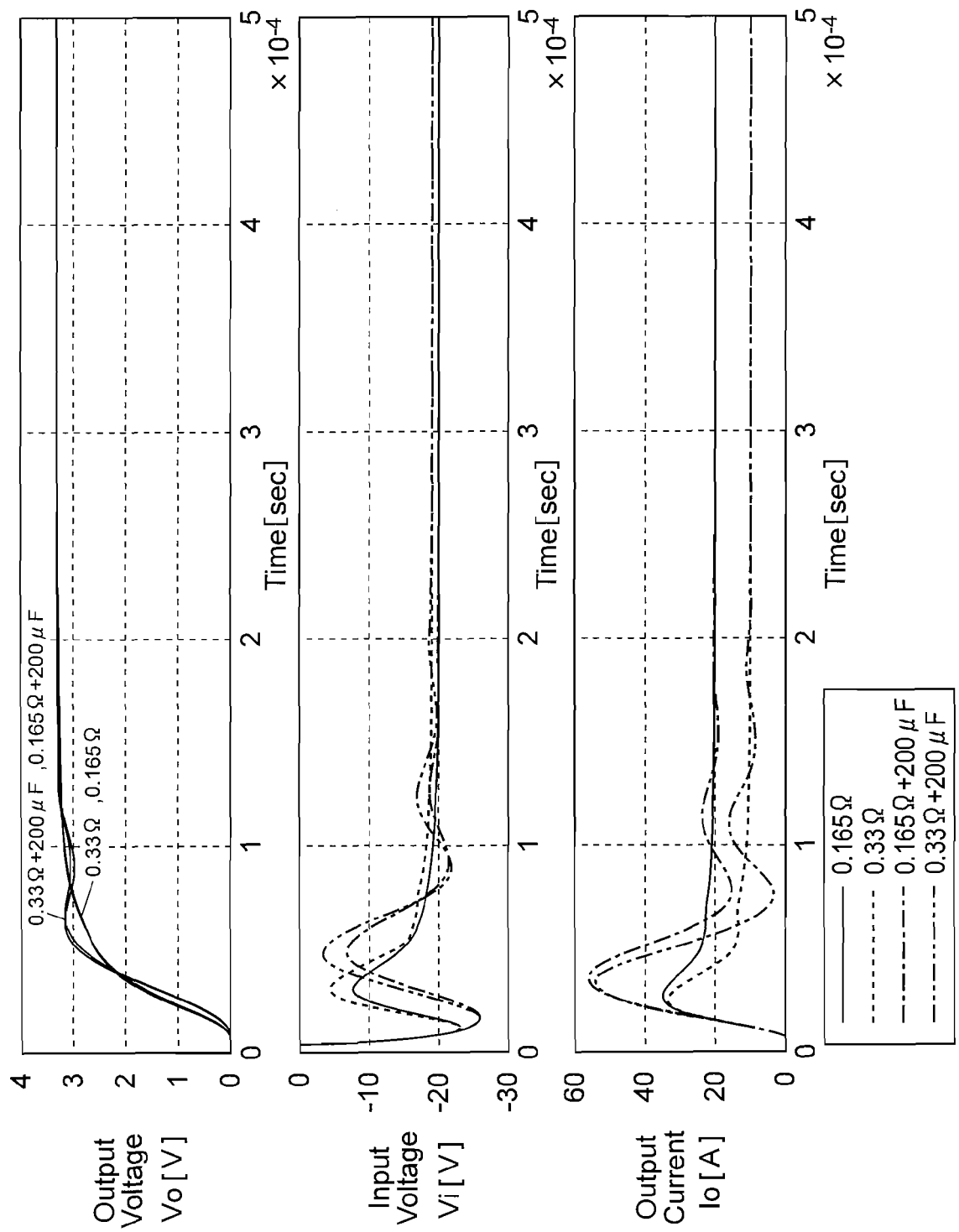
FIG. 21 is a waveform diagram representing each of response characteristics of an output voltage, an input voltage and an output current on start-up in a case of setting poles $H_2$, $H_3$ as appropriate real numbers, according to the second embodiment of the present invention.

FIG. 21 demonstrates start-up responses when the poles $H_2$, $H_3$ are set as suitable real numbers. In addition, the resistance value (Ω) and the capacitance (μF) in FIG. 21 correspond to the values of the load 8 and smoothing capacitor 11, respectively. Specifically, the start-up response for a capacitance load is largely separate from that of the target first-order model, so that its inferior robustness is shown.

Figure 22:
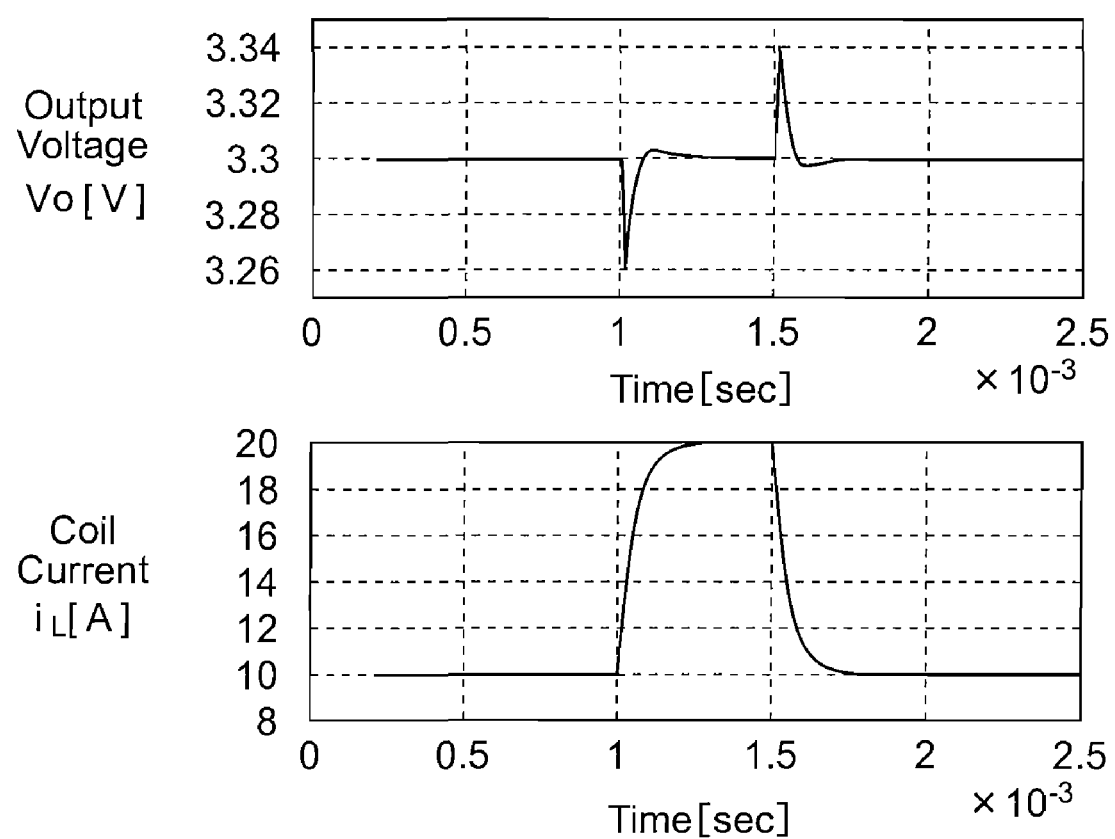
FIG. 22 is a waveform diagram representing a load current and an output voltage that show a dynamic load response in a case of an abrupt change in load, according to the second embodiment of the present invention.

FIG. 22 represents a dynamic load response at an abrupt load change. A load current (a coil current) is abruptly changed from 10 A to 20 A. The change in an output voltage Vo is, however, limited to or below 50 (mV), thus sufficiently permitting practical use.

The digital controller 90 obtained in this way is intended to realize the first-order approximate model transfer function shown in the equation 48. Hence, a configuration as the digital controller 90 becomes the most simple to allow a robust design of the approximate two-degree-of-freedom digital controller to be easily performed. Further, since the approximate two-degree-of-freedom digital controller 90 shown here is the same in type as the conventional integral type controller, various integral type controllers employed can be easily made robust.

As described above, the digital controllers 70, 90 designed to be robust are explained. There are given description hereinafter, for designing devices for practicing their designs. In addition, parts of descriptions given in the digital controllers 70, 90 are omitted as much as possible to avoid redundancy of the explanation.

Embodiment 3

Next, as a third embodiment of the present invention, a designing device of the digital controller 70 incorporating a control compensating means 70A of the integral type digital controller of the first embodiment is described with reference to FIGS. 8, 23 and 24.

Figure 23:
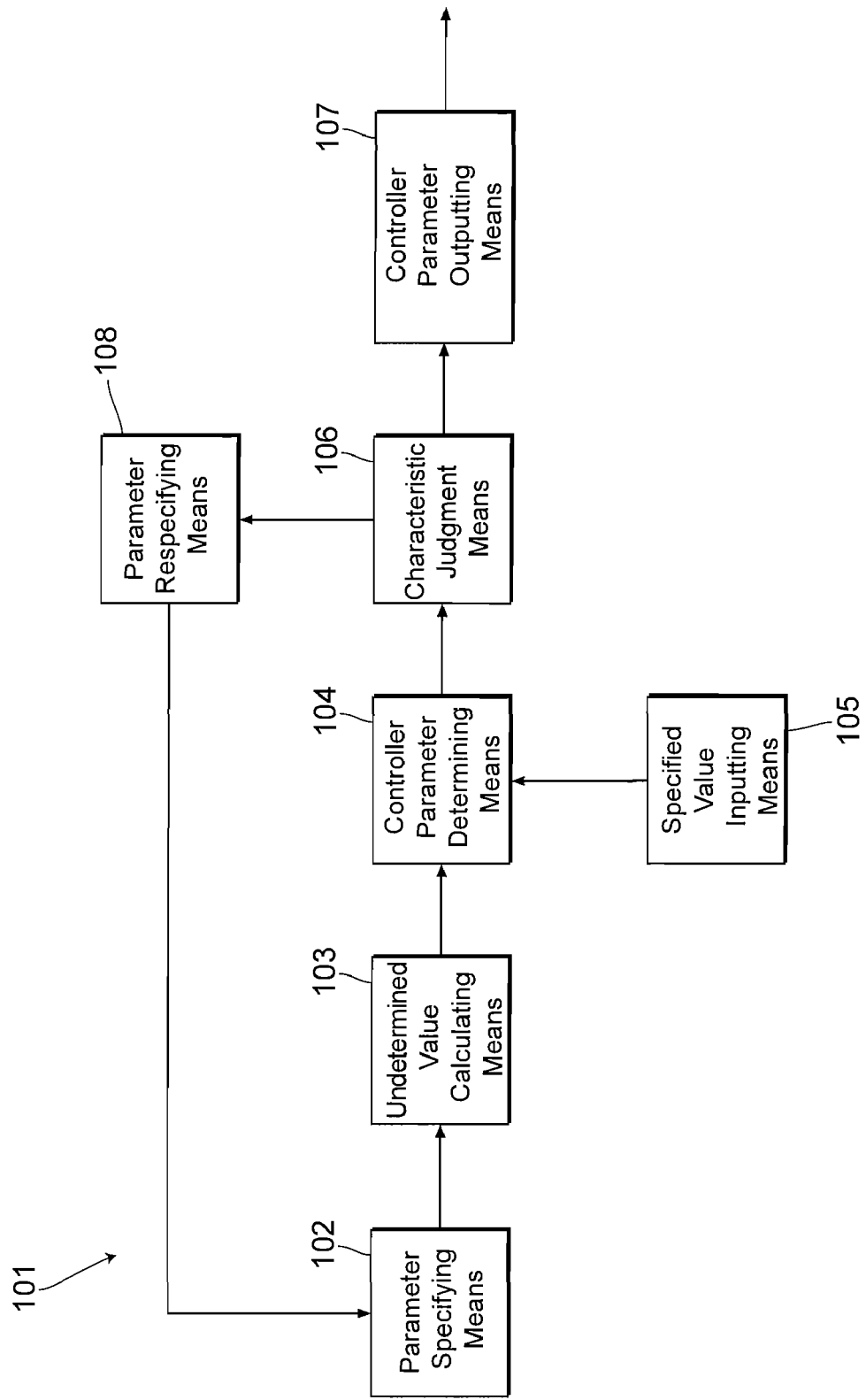
FIG. 23 is a block diagram representing a designing device configuration of a robust digital controller, according to a third embodiment of the present invention.

For the digital controller 70, into which the control compensation means 70A of the integral type digital control system shown in FIG. 8 is incorporated, FIG. 23 shows a configuration of the designing device capable of determining each of the parameter values $k_1$, $k_2$, $k_3$, $k_4$, $k_5$, $k_6$, $k_{1r}$, $k_{2r}$, $k_{3r}$, $k_i$, $k_{iz}$, $k_{in}$ shown in the equations 17 according to the foregoing design procedure. In FIG. 23, the designing device 101 comprises the following means: a parameter specifying means 102 for specifying pole values $H_1$, $H_2$ estimated to satisfy a bandwidth, which gives necessary gain and rise time and besides for specifying zero values $n_1$, $n_2$ of the control target 54 in a discrete-time and parameter values $p_1$, $p_2$, $p_3$, $k_z$; an undetermined value calculating means 103 for calculating each of undetermined values $n_0$, $H_3$ using the simultaneous equations 38 to 40; a controller parameter determining means 104 for calculating each of the parameter values $k_1$, $k_2$, $k_3$, $k_4$, $k_5$, $k_6$, $k_i$, $k_{iz}$, $k_{in}$ of the digital controller 70, using each of the values $n_0$, $H_3$ calculated by the undetermined value calculating means 103, preferably for calculating each of the parameter values $k_{1r}$, $k_{2r}$, $k_{3r}$ also; and a specified value inputting means 105 for inputting circuit constants L1, C1, Ro, R1, and a sampling period T, the sum L of time-lags, and a gain $K_p$ of the control target 54, all of which are necessary to calculate each of the parameter values $k_1$, $k_2$, $k_3$, $k_4$, $k_5$, $k_6$, $k_i$, $k_{iz}$, $k_{in}$ for the controller parameter determining means 104.

Further, as an desirable example, the designing device 101 is further equipped with the following means: a characteristic judgment means 106 to judge through simulation judgment whether desired characteristics can be obtained or not when the control target 54 is controlled by the digital controller 70, based on an assumption that each of the parameter values $k_1$, $k_2$, $k_3$, $k_4$, $k_5$, $k_6$, $k_{1r}$, $k_{2r}$, $k_{3r}$, $k_i$, $k_{iz}$, $k_{in}$ calculated by the controller parameter determining means 104, has been incorporated into the control compensating means 70A of the digital controller 70: a controller parameter outputting means 107 for practically incorporating each of the parameter values $k_1$, $k_2$, $k_3$, $k_4$, $k_5$, $k_6$, $k_{1r}$, $k_{2r}$, $k_{3r}$, $k_i$, $k_{iz}$, $k_{in}$ into the control compensating means 70A of the digital controller 70 when the characteristic judgment means 106 has judged that the desired characteristics could be obtained: and a parameter respecifying means 108 for making the parameter specifying means 102 specify different parameters $p_1$, $p_2$, $p_3$, $k_z$ to calculate each of the parameter values $k_1$, $k_2$, $k_3$, $k_4$, $k_5$, $k_6$, $k_{1r}$, $k_{2r}$, $k_{3r}$, $k_i$, $k_{iz}$, $k_{in}$ when the characteristic judgment means 106 has judged that no desired characteristic could be obtained.

The designing device 101 may be separate from the digital controller 70 or may be integrally incorporated thereinto. When being integrally incorporated into the digital controller 70, each of the parameter values $k_1$, $k_2$, $k_3$, $k_4$, $k_5$, $k_6$, $k_{1r}$, $k_{2r}$, $k_{3r}$, $k_i$, $k_{iz}$, $k_{in}$ calculated by the controller parameter determining means 104 may be incorporated into the control compensating means 70A of the digital controller 70. Thus, the control target 54 may be practically controlled by the digital controller 70 and a characteristic judgment means 106 may judge whether the desired characteristics have been obtained or not from measured values of each section. At that time, if the obtained characteristics are not desirable, the respective parameter values $k_1$, $k_2$, $k_3$, $k_4$, $k_5$, $k_6$, $k_{1r}$, $k_{2r}$, $k_{3r}$, $k_i$, $k_{iz}$, $k_{in}$ may be calculated again by the parameter respecifying means 108 and the calculated values may be incorporated into the control compensating means 70A by the characteristic judgment means 106. Further, the designing device 101 may be configured so that the characteristic judgment means 106 and the parameter respecifying means 108 are not included and the parameter values $k_1$, $k_2$, $k_3$, $k_4$, $k_5$, $k_6$, $k_{1r}$, $k_{2r}$, $k_{3r}$, $k_i$, $k_{iz}$, $k_{in}$ calculated by the controller parameter determining means 104, may be incorporated directly into the control compensating means 70A of the digital controller 70 by the controller parameter outputting means 107.

Figure 24:
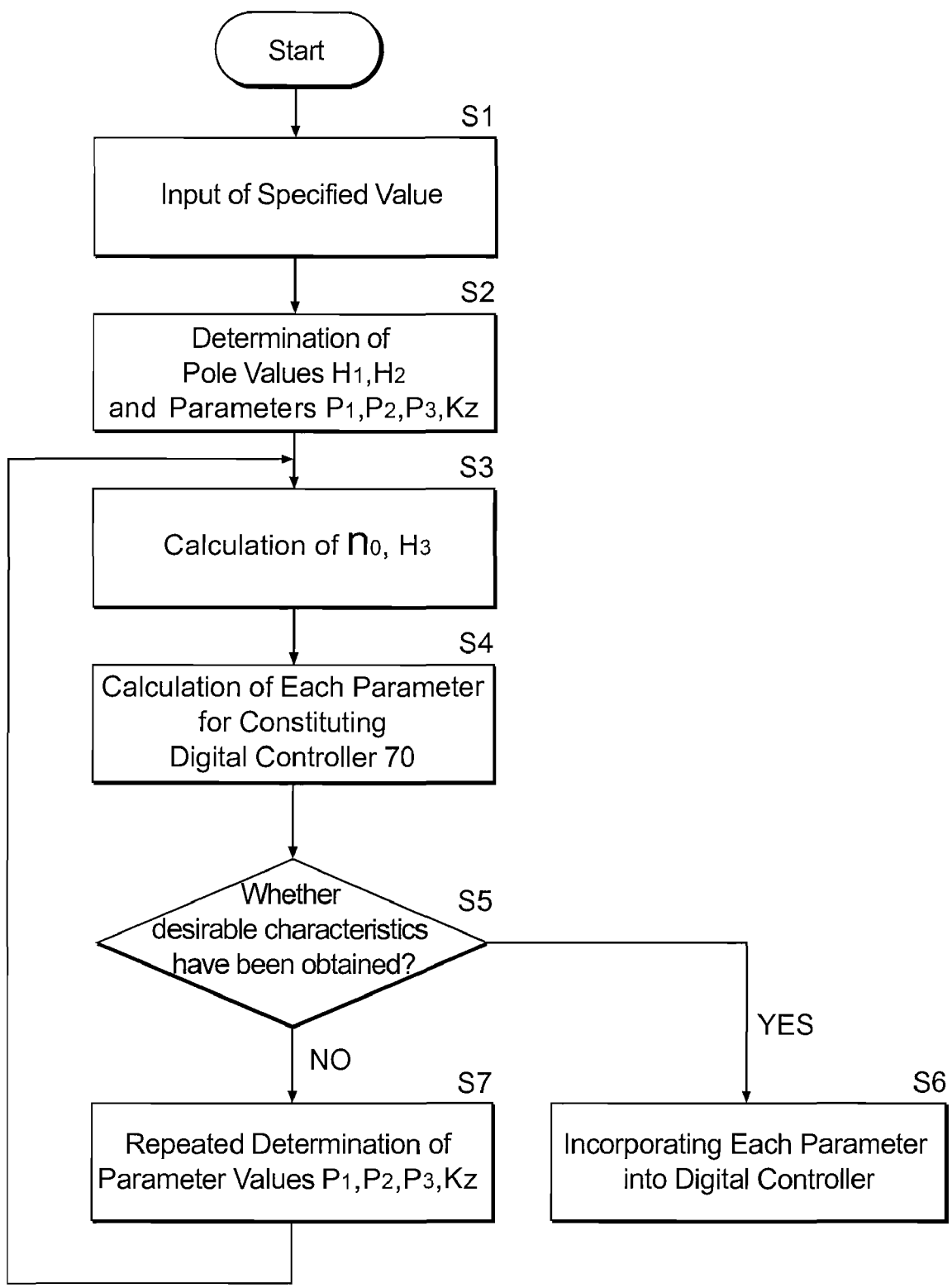
FIG. 24 is a flowchart representing an operational procedure of the designing device, according to the third embodiment of the present invention.

Next, the behavior of the designing device 101 with the above configuration is described using a flow chart in FIG. 24. After starting the designing device 101, as shown in a step S1 of FIG. 24, the circuit constants L1, C1, Ro, R1, the sampling period T, the sum L of the lag-times, and the gain $K_p$ of the control target 54 are respectively input using the specified value inputting means 105. These specified values may be preliminarily stored in the designing device 101 and may be able to be varied only when necessary. When all the necessary specified values are input, the parameter specifying means 102 specifies the pole values $H_1$, $H_2$ that are estimated to satisfy a bandwidth and a rise time to obtain necessary gain, the zero values $n_1$, $n_2$ of the control target 54 in the discrete-time and the parameter values $p_1$, $p_2$, $p_3$, $k_z$, to output these values to the undetermined value calculating means 103 (step S2). The values may utilize the values preliminarily stored in the parameter specifying means 102, for example as shown in the equations 45 to 47, or these values may be input in each case by an input means comprising a plurality of keys. An arithmetic program for solving the simultaneous equations of the equations 38 to 40 is incorporated into the undetermined value calculating means 103 and so upon receiving, from the parameter specifying means 102, the pole values $H_1$, $H_2$, the zero values $n_1$, $n_2$ of the control target 54 in the discrete-time and the parameter values of $p_1$, $p_2$, $p_3$, $k_z$, the undetermined value calculating means 103 calculates each of the undetermined the values $n_0$, $H_3$ (step S3).

As described above, when each of the values $n_0$, $H_3$ has been calculated, the controller parameter determining means 104 calculates, in the next step S4, each of the parameter values $k_1$, $k_2$, $k_3$, $k_4$, $k_5$, $k_6$, $k_{1r}$, $k_{2r}$, $k_{3r}$, $k_i$, $k_{iz}$, $k_{in}$ of the integral type digital control system, which realizes the quadratic approximate model shown in FIG. 8. In the designing device 101, into which no characteristic judgment means 106 and no parameter respecifying means 108 are incorporated, each of these parameters are output directly to the control compensating means 70A of the digital controller 70 using the controller parameter outputting means 107. When these characteristic judgment means 106 and parameter respecifying means 108 have been incorporated in the designing device 101, however, the characteristic judgment means 106 judges through the simulation judgment whether the desired characteristics (a frequency-gain characteristic and a frequency-phase characteristic) can be ensured by each of the parameters obtained (step S5). The judgment conditions used here have been preliminarily stored in the characteristic judgment means 106 and however, the judgment conditions can be updated, if necessary.

When the characteristic judgment means 106 has judged that the desired characteristics can be ensured by each of the parameters output from the controller parameter determining means 104, each of these parameters is output to the digital controller 70 connected with the designing device 101 to obtain the digital controller 70 with the desirable control characteristics (step 6). On the contrary, when it is determined that no desirable control characteristics can be ensured by each of the parameters output from the controller parameter determining means 104, different parameter values $p_1$, $p_2$, $p_3$, $k_z$ are specified by the parameter respecifying means 108 in step 7 and then after retuning again to the procedures following the step S3, each of the parameter values $k_1$, $k_2$, $k_3$, $k_4$, $k_5$, $k_6$, $k_{1r}$, $k_{2r}$, $k_{3r}$, $k_i$, $k_{iz}$, $k_{in}$ is calculated. In this case, in order to minimize the number of times of the judgment by the characteristic judgment means 106 as much as possible, it is desirable that first only a value of the parameter $k_z$, e.g., is slightly increased or decreased from the previously specified value defined as reference. Even if the characteristic judgment means 106 has judged that no desired characteristics can be obtained, it is desirable that each value of the parameters $p_1$, $p_2$, $p_3$, $k_z$ is made to increase or decrease slightly with the previously specified value similarly defined as the reference.

In the present embodiment, the digital controller 70 whose parameter values are determined by the design procedure described above is equipped with a designing device 101 comprising: the parameter specifying means 102 for specifying the pole values $H_1$, $H_2$ and further specifying the zero values $n_1$, $n_2$, of the control target in the discrete-time and the parameter values $p_1$, $p_2$, $p_3$, $k_z$; the undetermined value calculating means 103 for calculating each of undetermined values of the zero $n_0$, and pole $H_3$ from the related equations 38 to 40 by using each of the values specified by the parameter specifying means 102; and a controller parameter determining means 104 for calculating each of parameter values $k_1$, $k_2$, $k_3$, $k_4$, $k_5$, $k_6$, $k_i$, $k_{iz}$, $k_{in}$ that constitute the integral type control system by using each of the undetermined values of the zero $n_0$ and pole $H_3$ from undetermined value calculating means 103.

In this case, each of the parameter values $k_1$, $k_2$, $k_3$, $k_4$, $k_5$, $k_6$, $k_i$, $k_{iz}$, $k_{in}$ that gives the desired characteristics can be simply obtained by the designing device 101 without performing a complicated procedure.

Further, the control compensating means 70A of the digital controller 70, into which each of these parameters is incorporated, is configured, as an integral type control system capable of internally performing an arithmetic processing, on the basis of a model transfer function $W_m(z)$ which has been determined as the quadratic approximate model with a higher degree of approximation by approximating a discrete transfer function $W_{ry}(z)$ between the target value r and the controlled variable y. As a result, there can be realized the digital controller 70 that has a higher degree of approximation compared with the conventional approximate digital control system for realizing a first-order approximate model and besides is robust against output noises. Further, a robust design of the digital controller 70 can be easily performed without substantially considering the magnitude of a control input.

Furthermore, the digital controller 70 described here does not need the feedforward elements 77, 78, 79 or first to third feedforward means described hereinafter. Hence, no heavy burden is imposed on an arithmetic capacity of the digital controller 70 and besides the designing device 101 need not calculate the parameters of the feedforward, thus allowing a processing time to be shortened.

Besides, it is preferable that the integral type control system incorporated in the digital controller 70 is further equipped with a feedforward element 77 or a first feedforward means for outputting a product of the target value r and parameter $k_{1r}$, a feedforward element 78 or a second feedforward means for outputting a product of a target value r and parameter $k_{2r}$, and a feedforward element 79 or a third feedforward means for outputting a product of the target value r and parameter $k_{3r}$. Then, the integral type control system is preferably configured so that when an output of the feedforward element 79 is further added at a second adding point 85, an output of the feedforward element 78 is further added at a third adding point 43A, and an output of the feedforward element 77 is further added at a fourth adding point 43B, a controller parameter determining means 104 calculates each of the parameter values $k_1, k_2, k_3, k_4, k_5, k_6, k_{1r}, k_{2r}, k_{3r}, k_i, k_{iz}, k_{in}$ by using each of the undetermined values of the zero $n_0$ and the pole $H_3$ from the undetermined calculating means 103.

Thus, by adding the feedforward processing networks to the control compensating means 70A as the integral type control system of the digital controller 70, the digital controller 70 can realize further precise control. Consequently, the designing device 101 corresponding to the configured digital controller 70, can also calculate each of the parameter values including the parameters associated with the feedforward.

Moreover, in the designing device 101, into which the characteristic judgment means 106 and parameter respecifying means 108 are not incorporated, there may be included a controller parameter outputting means 107 that outputs each of the parameter values $k_1, k_2, k_3, k_4, k_5, k_6, k_{1r}, k_{2r}, k_{3r}, k_i, k_{iz}, k_{in}$ to the digital controller 70 connected with the designing device 101.

As a result, each of the parameter values calculated by the controller parameter determining means 104 is output directly to the digital controller 70. Hence, the trouble of inputting the parameters one by one to the digital controller 70 can be avoided.

Besides, the designing device 101 in the present embodiment is further equipped with: the characteristic judgment means 106 for assuming that each of the parameter values $k_1, k_2, k_3, k_4, k_5, k_6, k_{1r}, k_{2r}, k_{3r}, k_i, k_{iz}, k_{in}$ that have been calculated by the controller parameter determining means 104 has been incorporated in the digital controller 70 to judge whether the desired characteristics can be obtained or not when controlling the control target 54 by the digital controller 70; and a parameter respecifying means 108 for allowing a parameter specifying means 102 to specify different parameter values $p_1, p_2, p_3, k_z$, when judgment has been made that no desired characteristics could be obtained, and for allowing the controller parameter determining means 104 to calculate again each of the parameter values $k_1, k_2, k_3, k_4, k_5, k_6, k_{1r}, k_{2r}, k_{3r}, k_i, k_{iz}, k_{in}$.

As a result, each of the parameter values for giving the desired characteristics can be automatically calculated by the controller parameter determining means 104. Hence, a robust design of the digital controller 70 can be reliably practiced by using each of the final parameter values calculated by the controller parameter determining means 104.

Furthermore, there is further included a controller parameter outputting means 107 that outputs to the digital controller 70 each of the parameter values $k_1, k_2, k_3, k_4, k_5, k_6, k_{1r}, k_{2r}, k_{3r}, k_i, k_{iz}, k_{in}$ that have been calculated by the controller parameter determining means 104 only when the characteristic judgment means 106 has judged that the desired characteristics had been obtained. Hence, the parameter values capable of permitting the desired characteristics is merely output directly to the digital controller 70, thus enabling a robust design of the digital controller 70 to be simply and more reliably practiced.

Moreover, the designing device enables: equivalent conversion of the current feedback into the voltage feedback and the control feedback and model matching of the target characteristics by calculating the voltage feedback coefficients $k_1$, $k_2$, from the controlled variable y and the feedback coefficient $k_4$ of the pole of the dynamic filter; compensation for the time delay due to A/D conversion time and a digital encoding operation time by means of calculating the voltage feedback coefficient $k_3$ from the control target; equivalent conversion of the current feedback into the voltage feedback and the control input feedback by calculating the feedback coefficient $k_4$ of the pole for the dynamic filter; improvement in a degree of approximation of the quadratic approximate model by calculating the feedback coefficient $k_5$ of the zero added to the quadratic approximate model; improvement in a degree of approximation of the quadratic approximate model by calculating the voltage feedback coefficient $k_6$ from the controlled variable y for compensating a zero; elimination of part of the model matching of the target characteristics by calculating the feedforward coefficient $k_{iz}$; model matching realization of the target characteristics by calculating the feedforward coefficients $k_{1r}, k_{2r}$ from the target value r, and an approximate elimination of the pole of the transfer function between the equivalent disturbance Q and the controlled variable y by calculating the feedforward system $k_{3r}$ from the control target. Thereby, a design can be performed so that the transfer function between desire value r and the controlled variable y becomes unity within a necessary frequency band, while the transfer function between the equivalent disturbance Q and the controlled variable y becomes zero within a necessary frequency band.

As a result, an equivalent performance can be obtained by the voltage feedback without using the current feedback. Hence, the controller can be reduced in cost and a response time of the control system becomes shortened due to the elimination of the dead time resulting from digital control and further a degree of approximation of the approximate model is improved to enable the model matching of the target characteristics, thus allowing a robust design of the digital controller that is robust against disturbance.

Embodiment 4

Next, as a fourth embodiment of the present invention, a designing device of a digital controller 90, into which a control compensating means 90A of the integral type digital control system of the second embodiment is incorporated, is described with reference to FIGS. 15, 25 and 26.

Figure 25:
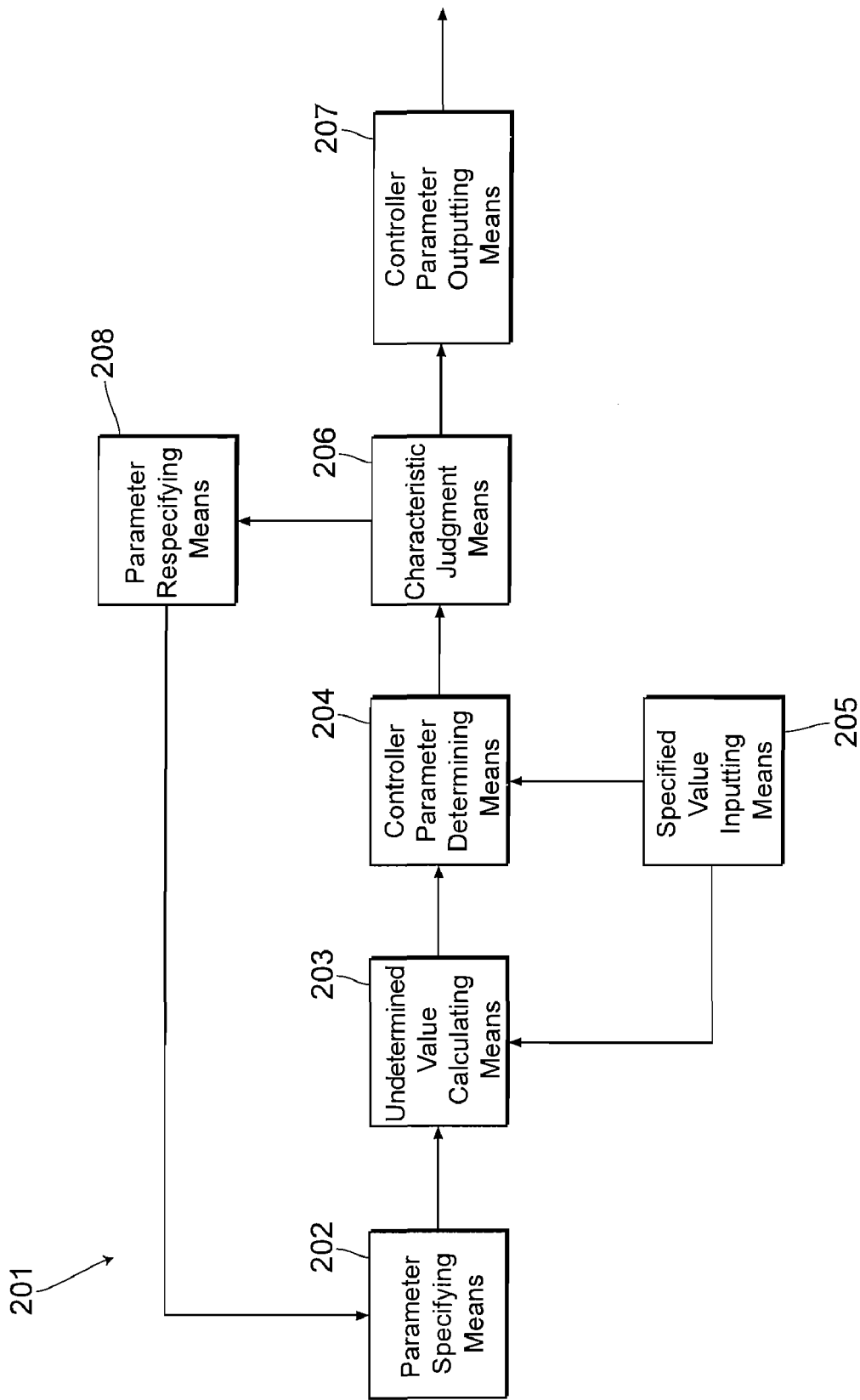
FIG. 25 is a block diagram representing a designing device configuration of a robust digital controller, according to a fourth embodiment of the present invention.

FIG. 25 denotes a configuration of the designing device capable of determining each of the parameter values $k_1$, $k_2$, $k_3$, $k_4$, $k_{1r}$, $k_{2r}$, $k_{i1}$, $k_{i2}$ shown in the equations 50 according to the design procedure described above with respect to the digital controller 90 incorporating a control compensating means 90A of the integral type digital control system shown in FIG. 15. In FIG. 25, the designing device 201 is equipped with the following means: a parameter specifying means 202 for specifying pole values $H_1$, $H_4$ estimated to satisfy a bandwidth and a rise time to obtain a necessary gain and further to specify the values of zero $n_1$, $n_2$ and the parameter values $p_1$, $p_2$, $p_3$, $k_z$; an undetermined value calculating means 203 for calculating each of undetermined values of poles $H_2$, $H_3$ by using the simultaneous equations 71 to 73; a controller parameter determining means 204 for calculating each of parameter values $k_1$, $k_2$, $k_3$, $k_4$, $k_{i1}$, $k_{i2}$ of the digital controller 90 by using each of the values $H_2$, $H_3$ calculated by the undetermined value calculating means 203 and preferably for calculating feedforward parameters $k_{r1}$, $k_{r2}$ also; a specified value inputting means 205 for inputting the circuit constants L1, C1, Ro, R1, a sampling period T, the sum L of lag times, and a gain $K_p$ of the control target 54 that are needed when the undetermined value calculating means 203 calculates each of the undetermined values of the poles $H_2$, $H_3$ and when the controller parameter determining means 204 calculates each of the foregoing parameter values $k_1$, $k_2$, $k_3$, $k_4$, $k_{1r}$, $k_{2r}$, $k_{i1}$, $k_{i2}$.

Further, as an desirable example, the designing device 201 is equipped with the following means: a characteristic judgment means 206 to judge through simulation judgment whether desired characteristics can be obtained or not when the control target 54 is controlled by the digital controller 90, based on an assumption that each of parameter values $k_1$, $k_2$, $k_3$, $k_4$, $k_{1r}$, $k_{2r}$, $k_{i1}$, $k_{i2}$ calculated by the controller parameter determining means 204 has been incorporated into the control compensating means 90A of the digital controller 90; further, a controller parameter outputting means 207 for practically incorporating each of the parameter values $k_1$, $k_2$, $k_3$, $k_4$, $k_{r1}$, $k_{r2}$, $k_{i1}$, $k_{i2}$, into the control compensating means 90A of the digital controller 90 when the characteristic judgment means 206 has judged that the desired characteristics could be obtained: and a parameter respecifying means 208 for allowing the parameter specifying means 202 to specify different values of zeros $n_1$, $n_2$ and the parameter values $p_1$, $p_2$, $p_3$, $k_z$ in order to calculate each of the parameter values $k_1$, $k_2$, $k_3$, $k_4$, $k_{r1}$, $k_{r2}$, $k_{i1}$, $k_{i2}$ when the characteristic judgment means 206 has judged that no desired characteristic could be obtained.

The designing device 201 may be separate from the digital controller 90 or may be integrally incorporated thereinto. When integrally incorporated, each of the parameter values $k_1$, $k_2$, $k_3$, $k_4$, $k_{r1}$, $k_{r2}$, $k_{i1}$, $k_{i2}$ calculated by the controller parameter determining means 204 may be incorporated into the control compensating means 90A of the digital controller 90. Thereby, the control target 54 may be practically controlled by the digital controller 90 and the characteristic judgment means 206 may judge whether the desired characteristics have been obtained or not from the measured values of each section. At that time, if the obtained characteristics are not desirable, each of the parameter values $k_1$, $k_2$, $k_3$, $k_4$, $k_{1r}$, $k_{2r}$, $k_{i1}$, $k_{i2}$ is calculated again by the parameter respecifying means 208 and the calculated values may be incorporated into the control compensating means 90A by the characteristic judgment means 206. Further, the designing device 201 may be configured so that the characteristic judgment means 206 and the parameter respecifying means 208 are not included, and the parameter values $k_1$, $k_2$, $k_3$, $k_4$, $k_5$, $k_6$, $k_{1r}$, $k_{2r}$, $k_{3r}$, $k_i$, $k_{iz}$, $k_{in}$ calculated by the controller parameter determining means 204 may be merely incorporated directly into the control compensating means 90A of the digital controller 90 by the controller parameter outputting means 207.

Figure 26:
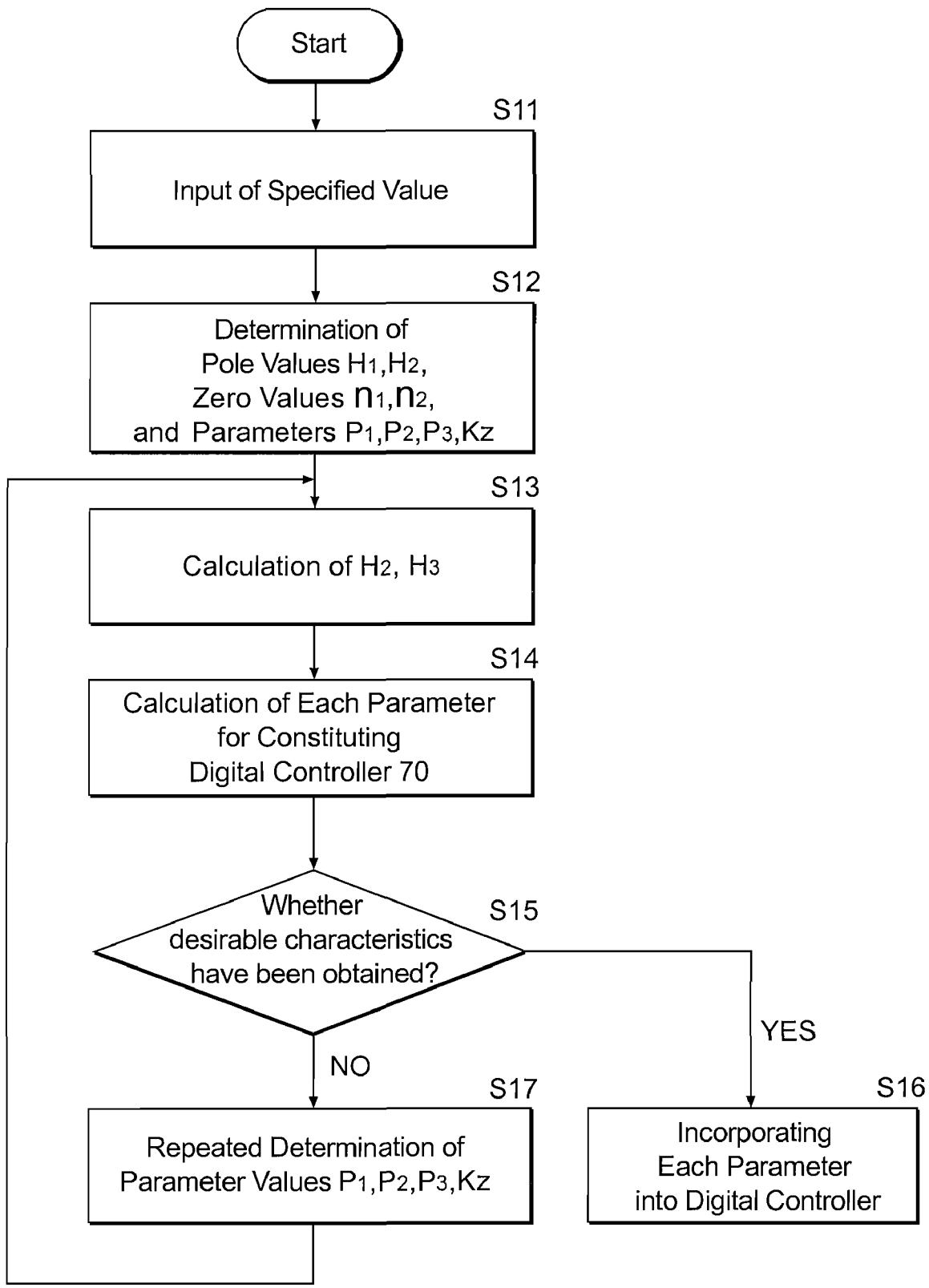
FIG. 26 is a flowchart representing an operational procedure of the designing device, according to a fourth embodiment of the present invention.

Next, the behavior of the designing device 201 equipped with the above configuration is described using a flow chart in FIG. 26. After starting the designing device 201, as shown in a step S11 in FIG. 26, the circuit constants L1, C1, Ro, R1, the sampling period T, the sum L of the lag times, and the gain $K_p$ of the control target 54 are respectively input using the specified value inputting means 205. These specified values may be preliminarily stored in the designing device 201 and can be varied only when necessary. When all the specified values needed have been input, the parameter specifying means 202 specifies the pole values $H_1$, $H_4$ the zero values $n_1$, $n_2$ of the control target 54 in the discrete-time, and the parameters $p_1$, $p_2$, $p_3$, $k_z$ that are estimated to satisfy a bandwidth and a rise time by which a necessary gain can be obtained in order to output these values to the undetermined value calculating means 203 (step S12). As an example of these values, as shown in the equations 62 to 74, the values stored preliminarily in the parameter specifying means 202 may be utilized or these values may be input in each case by an input means comprising a plurality of keys. Upon receiving the pole values $H_1$, $H_4$, the zero values $n_1$, $n_2$ and the parameter values $p_1$, $p_2$, $p_3$, $k_z$ from the parameter specifying means 202, the undetermined value calculating means 203 calculates each of the undetermined values $H_2$, $H_3$ (step S13). These undetermined values $H_2$, $H_3$ may be calculated as real numbers a shown in the equation 56. It is, however, preferable that these values may be calculated as conjugate complex numbers expressed by $H_2 = x + yi$, $H_3 = x - yi$ for the purpose of enhancing the degree of approximation. To that end, an arithmetic program for solving the simultaneous equations of the equations 71 to 73 is incorporated in the undetermined value calculating means 203.

When each of the values $H_2$, $H_3$ has been calculated as described above, in the next step S14, a controller parameter determining means 204 calculates, each of the parameter values $k_1$, $k_2$, $k_3$, $k_4$, $k_{r1}$, $k_{r2}$, $k_{i1}$, $k_{i2}$ of the integral type digital control system that realizes the first-order approximate model shown in FIG. 15. In the designing device 201, into which the characteristic judgment means 206 and the parameter respecifying means 208 are not incorporated, each of these parameters is output directly to the control compensating means 90A of the digital controller 90 utilizing the controller parameter outputting means 207. When these characteristic judgment means 206 and parameter respecifying means 208 have been incorporated into the designing device 201, however, the characteristic judgment means 206 judges by using simulation judgment whether the desired characteristics (a frequency-gain characteristic and a frequency-phase characteristic) can be acquired by each of the obtained parameters (step S15). Judgment conditions used here have been preliminarily stored in the characteristic judgment means 206, while if required, the judgment conditions can be updated.

When the characteristic judgment means 206 has judged that the desired characteristics could be obtained by each of the parameters output from the controller parameter determining means 204, each of these parameters is output to the digital controller 90 connected with the designing device 201 in order to obtain the digital controller 90 with the desirable control characteristics (step 16). On the contrary, when it is judged that no desirable control characteristics can be obtained by each of the parameters output from the controller parameter specifying means 204, different parameter values $p_1$, $p_2$, $p_3$, $k_z$ are specified by the parameter respecifying means 208 in the step 17 and then after returning again to the procedures following the step S13, each of the parameters $k_1$, $k_2$, $k_3$, $k_4$, $k_{1r}$, $k_{2r}$, $k_{3r}$, $k_i$, $k_{iz}$, $k_{in}$ is calculated.

As described above, the digital controller 90 of the present embodiment is equipped with the control compensating means 90A for realizing the integral type control system, shown in FIG. 17, obtained by equivalently converting the system shown in FIG. 7 and the control compensating means 90A is connected with a control target i.e., the control target element 54 for satisfying the foregoing state equation 26 when an input h, the controlled variable y, the first equivalent disturbance $q_v$, the second equivalent disturbance $q_v$ and the time-lag $\xi_1$ are given respectively. The system shown in FIG. 7 is formed by approximating a transfer function $W_{ry}(z)$ between the target value r and the controlled variable y when the state feedback rule shown in the equation 19 and the feedforward rule shown in the equation 20 are applied to the control target element 54 to determine the first-order approximate model transfer function $W_m(z)$ shown in the equation 48 from the equation of the quartic discrete-time system shown by the equation 21 and then by combining the model transfer function $W_m(z)$, the inverse function $W_m(z)^{-1}$ of the model transfer function $W_m(z)$ and the filter 63 that is the dynamic compensator K(z) for realizing the inverse function $W_m(z)^{-1}$.

Further, the control compensating means 90A comprises the following elements and adding points: a feedback element 91 or a first feedback means for outputting a product of the controlled variable y and parameter $k_1$; a feedback element 92 or a second feedback means for outputting a product of the controlled variable y and parameter $k_2$; a feedback element 93 or a third feedback means for outputting a product of a first time-lag output $\xi_1$ and parameter $k_3$; a feedback element 94 or a fourth feedback means for outputting a product of a second time-lag output $\xi_2$ and parameter $k_4$; a feedback element 95 or a fifth feedback means for outputting a product of the controlled variable y and 1/g; a first adding point 87 or a first arithmetic means for calculating a difference between the controlled variable y and an output of the feedback element 95; an element 83 or an integrating means for converting the calculated value from the first adding point 87 into an integrated output; an element 98 or a first integrating means for outputting a product of an output from the element 83 and parameter $k_{i1}$; an element 99 or a second integrating means for outputting a product of an output from the element 83 and parameter $k_{i2}$; a second adding point 43A for adding a second equivalent disturbance $q_v$, an output from the element 99, an output of the feedback element 91, an output of the feedback element 93, and an output of the feedback element 94; an element 44A of an order 1/z or a time-lag means for giving the added result from the second adding point 43A into the second time-lag output $\xi_2$ lagged by sampling; and a third adding point 43B or a second adding means for adding an output from the element 44A, an output from the element 98, and an output from the feedback element 92 to produce an input η to the control target element 54.

Besides, in the present embodiment, the digital controller 90 with the above configuration includes a designing device 201 comprising a parameter specifying means 202 for specifying the zero values $n_1$, $n_2$ of the control target in the discrete-time and the parameter values $p_1$, $p_2$ $p_1$, $k_z$ as well as specifying the pole values $H_1$, $H_4$, an undetermined value calculating means 203 for calculating each of the undetermined values of the poles $H_2$, $H_3$, from the relational expressions shown in the equations 71 to 73 using each value specified by the parameter specifying means 202, and a controller parameter determining means 204 for calculating each of the parameter values $k_1$, $k_2$, $k_3$, $k_4$, $ki_1$, $ki_2$ that constitute the integral type control system by using each of the undetermined values of the poles $H_2$, $H_3$, from the undetermined value calculating means 203.

In this case, each of the parameter values $k_1$, $k_2$ $k_3$, $k_4$, $ki_1$, $ki_2$ to give the desired characteristics can be simply obtained by the designing device 201 without performing a complicated procedure.

Further, the control compensating means 90A of the digital controller 90 incorporating these parameters is configured as the integral type control system capable of performing internally an arithmetic processing based on the model transfer function that has been specified as a first-order approximate model transfer function $W_m(z)$ with a comparatively simple processing formation by approximating the discrete transfer function $W_{ry}(z)$ between the target value r and the controlled variable y. Consequently, utilizing the foregoing designing device 202 permits a robust design to be simply practiced for an approximate two-degree-of-freedom robust digital control system for realizing a first-order approximate model.

Further, the digital controller 90 described here does not need the feedforward elements 96, 97 or first and second feedforward means described hereinafter and therefore no heavy burden is imposed on the arithmetic capacity of the digital controller 90. Besides, there is no need for the designing device 90 to calculate the feedforward parameter, thus enabling the processing time to be shortened.

Besides, it is preferable that when the integral type control system incorporated into the robust digital controller 90 described here is equipped with the feedforward element 96 that is a first feedforward means for outputting a product of the target value r and parameter $K_{1r}$ and the feedforward element 97 that is a second feedforward means for outputting a product of the target value r and parameter $K_{2r}$ and when an output of the feedforward element 97 is added further at the second adding point 43A and an output of the feedforward element 96 is added further at the third adding point 43B, the controller parameter determining means 204 calculates each of the foregoing parameter values $k_1$, $k_2$ $k_3$, $k_4$, $k_{r1}$, $k_{r2}$ $k_{i1}$, $k_{i2}$ by utilizing each of the undetermined values of the poles $H_1$, $H_2$ from the undetermined value calculating means 203.

In this manner, the digital controller 90 can realize a higher-accuracy control by adding the feedforward processing networks to the control compensating means 90A as the integral type control system of the digital controller 90. Corresponding to the digital controller 90 like this, at the same time the designing device 201 can also calculate each of parameter values including the parameters relevant to the feedforward.

Further, the designing device 201, into which the characteristic judgment means 206 and the parameter respecifying means 208 are not incorporated, may include the controller parameter outputting means 207 that outputs, to the digital controller 90 connected with the designing device, each of the parameter values $k_1$, $k_2$ $k_3$, $k_4$, $k_{r1}$, $k_{r2}$, $ki_1$, $k_{i2}$ that have been calculated by the controller parameter determining means 204.

Thereby, each of the parameter values calculated by the controller parameter determining means 204 is output directly to the digital controller 90. Hence, the trouble of having to input the parameter values one by one to the digital controller 90 can be avoided.

Further, the designing device 201 in the present embodiment is equipped with a characteristic judgment means 206 to judge whether the desired characteristics can be obtained or not when controlling a control target 54 by the digital controller 90, based on an assumption that each of the parameter values $k_1, k_2, k_3, k_4, k_{r1}, k_{r2}, k_{i1}, k_{i2}$ calculated by the controller parameter determining means 204 has been incorporated into the digital controller 90, and is further equipped with a parameter respecifying means 208 for specifying different parameter values $p_1, p_2, p_3, k_z$ by a parameter specifying means 202 when characteristic judgment means 206 has judged that no desired characteristics could be obtained to allow the controller parameter determining means 204 to calculate again each of the parameter values $k_1, k_2, k_3, k_4, k_{r1}, k_{r2}, k_{i1}, k_{i2}$.

As a result, each of the parameter values to give the desired characteristics can be automatically calculated by the controller parameter determining means 204. Hence, a robust design of the digital controller 90 can be reliably practiced by using each of the final parameter values calculated by the controller parameter determining means 204.

Furthermore, the designing device 201 is further equipped with the controller parameter outputting means 207 for outputting each of the parameter values $k_1, k_2, k_3, k_4, k_{r1}, k_{r2}, k_{i1}, k_{i2}$ that have been calculated by the controller parameter determining means 204 to the digital controller 90 only when the characteristic judgment means 206 has judged that the desired characteristics have been obtained. Hence, only the parameter values to give the desired characteristics is output directly to the digital controller 90, allowing the robust design of the digital controller 90 to be simply and more reliably performed.

In addition, it goes without saying that the present invention is not limited to the embodiments described above and various modifications are possible within the scope of the present invention. Various type converters such as a non-insulative type converter without employing the transformer 3 and a converter including a plurality of switching elements (e.g., a half-bridge converter and a full-bridge converter) can be applied to the configuration of the converter section 2 acting as a control target shown in FIG. 1. Further, the robust digital controller in the present embodiment is applicable to all of devices in which feedback control is performed.

The invention claimed is:

1. A designing device of a robust digital controller, wherein said designing device realizes an integral type control system that is obtained by equivalently converting a system and is connected with a control target satisfying the following state equation 5 when an input h, a controlled variable y, a first equivalent disturbance $q_v$, a second equivalent disturbance $q_y$ and a time-lag $\xi_1$ are given respectively:

$$x_d(k+1) = A_d x_d(k) + B_d h(k)$$

$$y(k) = C_d x_d(k) + q_y(k)$$

where $x_d = [x\xi]^T$   Equation 5 wherein aid system converted is formed by approximating a transfer function $W_{ry}(z)$ between a target value r and said controlled variable y when a state feedback rule and a feed-forward rule are applied to said control target to determine a quadratic approximate model transfer function $W_m(z)$ shown in the following equation 6:

$$W_{ry} = \frac{(1+H_1)(1+H_2)(1+H_3)(z-n1)(z-n2)(z+H_4)}{(1-n1)(1-n2)(z+H_1)(z+H_2)(z+H_3)(z+H_4)}$$   Equation 6

$$\approx W_m(z) = \frac{(1+H_1)}{(z+H_1)}$$

(where $z = \exp(j\omega t)$; $n_0, n_1, n_2$ are zeros; and $H_1, H_2, H_3, H_4$ are poles.) and then by combining the model transfer function $W_m(z)$, an inverse function $W_m(z)^{-1}$ of said model transfer function $W_m(z)$ and a dynamic compensator K(z) with characteristics, shown in the equation 7, for realizing the inverse function $W_m(z)^{-1}$:

$$k(z) = \frac{k_z}{z - 1 + k_z}$$   Equation 7 said integral type control system, further comprising:
a first feedback means configured to output a product of said controlled variable y and parameter $k_1$,
a second feedback means configured to output a product of said controlled variable y and parameter $k_2$,
a third feedback means configured to output a product of a first time-lag output $\xi_1$ and parameter $k_3$,
a fourth feedback configured to output a product of a second time-lag output $\xi_2$ and parameter $k_4$,
a fifth feedback means configured to output a product of a third time-lag output $\xi_3$ and a parameter $k_5$,
a sixth feedback means configured to output a product of said controlled variable y and parameter $k_6$,
a first arithmetic means configured to calculate a difference between said controlled variable y and said target value r,
an integrating means configured to integrate the calculated value from the first arithmetic means to covert the integrated value into a fourth time-lag output $\xi_4$,
a first accumulating means configured to output a product of a fourth time-lag output $\xi_4$ from said integrating means and parameter $k_{in}$,
a first adding means configured to add an output from said first accumulating means, an output from said fifth feedback means and an output from said sixth feedback means,
a first time-lag means configured to output said third time-lag output $\xi_3$ that has made the added result from said first adding means undergo a sampling time-lag,
a second accumulating means configured to output a product of a third time-lag output $\xi_3$ and a parameter $k_i$,
a third accumulating means configured to output a product of a third time-lag output $\xi_3$ and a parameter $k_{iz}$,
a second adding means configured to add said second equivalent disturbance $q_v$, an output from said second accumulating means, an output from said first feedback means, an output from said third feedback means and an output from said fourth feedback means,
a second time-lag means configured to output said second time-lag output $\xi_2$ that has made the added result from said second adding means undergo a sampling time-lag,
a third adding means configured to add an output from said second time-lag means, an output from said third accumulating means and an output from said second feedback means to produce an input h to said control target, wherein each parameter is expressed as equation 8 when said state feedback rule $F = [F(1,1)\ F(1,2)\ F(1,3)\ F(1,4)]$ and said feedforward rule G have been applied:

$$k_1 = -F(1,1) - F(1,2)FF(1,1) +$$   Equation 8
$$((-F(1,4) - F(1,2)FF(1,4))(-F(1,2)/FF(1,2))) -$$
$$(GH4 + GF_z)((1 - n_0)k_z/((1+H1)(1+H2)))$$

-continued $$k_2 = -F(1,2)/FF(1,2) - G((1-n_0)k_z/((1+H1)(1+H2)))$$

$$k_3 = -F(1,3) - F(1,2)(FF(1,3))$$

$$k_4 = F_z$$

$$k_5 = n_0$$

$$k_6 = -(k_z(1-n_0)(1+H1+H2) + n_0(1-n_0)k_z)/$$
$$((1+H1)*(1+H2))$$

$$k_i = GH4 + GF_z$$

$$k_{iz} = G$$

$$k_{in} = k_z(1-n_0)$$

$$FF(1,1) = -A_d(1,1)/A_d(1,2)$$

$$FF(1,2) = A_d(1,2)$$

$$FF(1,3) = -A_d(1,3)/A_d(1,2)$$

$$FF(1,4) = -B_d(1,1)/A_d(1,2)$$

$$F_z = -F(1,4) - F(1,2)FF(1,4)$$

wherein said designing device comprises:

a parameter specifying means configured to specify pole values $H_1$, $H_2$, zero values $n_1$, $n_2$ of said control target in a discrete-time and parameter values $p_1$, $p_2$, $p_3$, $k_z$, an undetermined value calculating means configured to calculate each of undetermined values of a zero $n_0$ and pole $H_3$ from the following relational equation shown in equation 9 by using each of the pole values specified by said parameter specifying means:

$$(-n_1(-n_0) - n_2(-n_0) + H_3n_1n_2 - n_2H_3 -$$
$$H_3n_1 + k_z(-n_0)H_3 + n_1n_2(-n_0) + k_z - 1 -$$
$$n_1n_2 + k_z(-n_0) + H_3 + n_1 + n_2 + k_zH_3 + (-n_0))/$$
$$(1 - n_2 - n_1 + n_1n_2) = -(p1 + p3 + p2)$$

$$(-k_zn_1(-n_0) - k_zn_2(-n_0)H_3 - H_3n_1n_2 +$$
$$(-n_0)H_3 + n_1n_2(-n_0)H_3 + H_3n_1 - n_2(-n_0)H_3 -$$
$$H_3 - k_zn_1H_3 - k_zn_2H_3 - k_zn_2(-n_0) - k_zn_1 -$$
$$k_zn_2 - n_1(-n_0)H_3 - n_1n_2(-n_0) + n_2(-n_0) +$$
$$n_2H_3 + n_1(-n_0) - (-n_0) - k_zn_1(-n_0)H_3)/$$
$$(1 - n_2 - n_1 + n_1n_2) = p1p3 + p1p2 + p2p3$$

$$(k_zn_1n_2(-n_0) - (-n_0)H_3 + k_zH_3n_1n_2 + k_zn_1n_2(-n_0)H_3 +$$
$$n_2(-n_0)H_3 + n_1(-n_0)H_3 - n_1n_2(-n_0)H_3 + k_zn_1n_2)/$$
$$(1 - n_2 - n_1 + n_1n_2) = -p1p2p3$$

Equation 9 a controller parameter determining means configured to calculate each of parameter values $k_1$, $k_2$, $k_3$, $k_4$, $k_5$, $k_6$, $k_i$, $k_{iz}$, $k_{in}$ that constitute said integral type control system by using each of the undetermined values from said undetermined value calculating means; and a controller parameter outputting means configured to output each of the parameter values calculated by said controller parameter determining means to said robust digital controller.

2. A designing device of a robust digital controller according to claim 1, wherein an integral type control system incorporated into said robust digital controller, further comprising:

a first feedforward means configured to output a product of said target value r and parameter $k_{1r}$, a second feedforward means configured to output a product of said target value r and parameter $k_{2r}$, a third feedforward means configured to output a product of said target value r and parameter $k_{3r}$, wherein an output of said third feedforward means is further added by the first adding means, an output of said second feedforward means is further added by the second adding means, an output of said first feedforward means is further added by the third adding means, wherein when said parameters are made up so as to satisfy $k_{1r}=G$, $k_{2r}=GH_4+GF_z$, $k_{3r}=k_z$, said controller parameter determining means calculates each of parameter values $k_1$, $k_2$, $k_3$, $k_4$, $k_5$, $k_6$, $k_{1r}$, $k_{2r}$, $k_{3r}$, $k_i$, $k_{iz}$, $k_{in}$ by using each of the undetermined values from said undetermined value calculating means.

3. A designing device of a robust digital controller according to claim 1, wherein said designing device further comprises:

a characteristic judgment means configured to judge whether each of the parameter values calculated in said controller parameter determining means has been incorporated into said robust digital controller to judge whether desired characteristics can be obtained or not when said control target is controlled by the robust digital controller, a parameter respecifying means configured to trigger said parameter specifying means to specify different parameter values $p_1$, $p_2$, $p_3$, $k_z$, when said characteristic judgment means has judged that no desired characteristic could be obtained and then making said controller parameter determining means calculate again the parameter values.

4. A designing device of a robust digital controller according to claim 3, further comprising a controller parameter outputting means configured to output each of parameter values calculated in said controller parameter determining means to said robust digital controller when said characteristic judgment means has judged that desired characteristics have been obtained.

5. A designing device of a robust digital controller wherein said designing device realizes an integral type control system that is obtained by equivalently converting a system and is connected with a control target satisfying state equation 10 when an input h, a controlled variable y, a first equivalent disturbance $q_y$, a second equivalent disturbance $q_v$ and a time-lag $\xi_1$ are given respectively:

$$x_d(k+1) = A_d x_d(k) + B_d h(k)$$

$$y(k) = C_d x_d(k) + q_y(k)$$

wherein $x_d = [x\xi]^T$   Equation 10 wherein said system converted is formed by approximating a transfer function $W_{ry}(z)$ between a target value r and said controlled variable y when a state feedback rule and a feedforward rule are applied to said control target to determine a quadratic approximate model transfer function $W_m(z)$ shown in following equation 11, $$W_{ry} = \frac{(1+H_1)(1+H_2)(1+H_3)(z-n1)(z-n2)(z+H_4)}{(1-n1)(1-n2)(z+H_1)(z+H_2)(z+H_3)(z+H_4)}$$

$$\approx W_m = \frac{(1+H_1)(1+H_2)(z-n_0)}{(z+H_1)(z+H_2)(1-n_0)}$$

Equation 11

(where $z=\exp(j\omega t)$; $n_0$, $n_1$, are zeros; and $H_1$, $H_2$, $H_3$, $H_4$ are poles.)

and then by combining the model transfer function $W_m(z)$, an inverse function $W_m(z)^{-1}$ of said model transfer function $W_m(z)$ and a dynamic compensator $K(z)$ that has characteristics, shown in equation 12, for realizing the inverse function $W_m(z)^{-1}$, $$k(z) = \frac{k_z}{z - 1 + k_z} \qquad \text{Equation 12}$$

said integral type control system, further comprising:
a first feedback means configured to output a product of said controlled variable y and parameter $k_1$,
a second feedback means configured to output a product of said controlled variable y and parameter $k_2$,
a third feedback means configured to output a product of a first time-lag output $\xi_1$ and parameter $k_3$,
a fourth feedback means configured to output a product of a second time-lag output $\xi_2$ and parameter $k_4$,
a fifth feedback means configured to output a product of said controlled variable y and 1/g (g denotes a steady-state gain between a target value r and a controlled variable y),
a first calculating means configured to calculate a difference between said controlled variable y and an output of the fifth feedback means,
an integrating means configured to integrate the calculated value from the first calculating means to covert the calculated value into an integrated output,
a first accumulating means for outputting a product of an output from said integrating means and an output of parameter $k_{i1}$,
a second accumulating means configured to output a product of an output from said integrating means and an output of parameter $k_{i2}$,
a first adding means configured to add said second equivalent disturbance $q_v$, an output from said second accumulating means, an output from said first feedback means, an output from said third feedback means and an output from said fourth feedback means,
a time-lag means configured to sample an added result from said first adding means into said second time-lag output $\xi_2$,
a second adding means configured to add an output from said time-lag means, an output from said first accumulating means and an output from said second feedback means to produce an input η to said control target,
wherein each parameter is expressed as equation 13 when said state feedback rule $F=[F(1,1)\ F(1,2)\ F(1,3)\ F(1,4)]$ and said feedforward rule G have been applied:

$$k_1 = F(1,1) - F(1,2)A_d(1,1)/A_d(1,2) + \qquad \text{Equation 13}$$
$$(-F(1,4) + F(1,2)B_d(1,1)/A_d(1,2))$$
$$F(1,2)/A_d(1,2) +$$
$$(GH4 + G(-F(1,4) + F(1,2)B_d(1,1)/A_d(1,2)))$$
$$k_z/(1 + H2)$$
$$k_2 = F(1,2)/A_d(1,2) + Gk_z/(1+H2)$$
$$k_3 = F(1,3) - F(1,2)A_d(1,3)/A_d(1,2)$$

-continued
$$k_4 = F(1,4) - F(1,2)B_d(1,1)/A_d(1,2)$$
$$k_{i1} = gGk_z$$
$$k_{i2} = g(GH4 + G(-F(1,4) + F(1,2)B_d(1,1)/A_d(1,2)))k_z$$

wherein said designing device comprises:
a parameter specifying means configured to specify pole values $H_1$, $H_4$, zero values $n_1$, $n_2$ of said control target in a discrete-time and parameter values $p_1$, $p_2$, $p_3$, $k_z$,
an undetermined value calculating means configured to calculate each of undetermined values of $H_2=x+yi$, $H_3=x-yi$ from the following relational equation shown in equation 14, by using each of the values specified by said parameter specifying means:

$$(k_z x^2 + (2k_z - 2n_2 + 2n_1 n_2 - 2n_1 + 2)x + \qquad \text{Equation 14}$$
$$k_z y^2 + (-1 + n_2 + k_z - n_1 n_2 + n_1))/$$
$$(1 - n_2 - n_1 + n_1 n_2) = -p1 - p3 - p2$$
$$((-k_z n_1 + n_1 n_2 - n_2 + 1 - n_1 - k_z n_2)x^2 +$$
$$(2n_2 + 2n_1 - 2k_z n_2 - 2n_1 n_2 - 2k_z n_1 - 2)x +$$
$$(-k_z n_1 + n_1 n_2 - n_2 + 1 - n_1 - k_z n_2)y^2 -$$
$$k_z n_2 - k_z n_1)/(1 - n_2 - n_1 + n_1 n_2) =$$
$$p1p3 + p1p2 + p2p3$$
$$((-1 + n_2 + k_z n_1 n_2 - n_1 n_2 + n_1)x^2 + 2k_z n_1 n_2 x +$$
$$(-1 + n_2 + k_z n_1 n_2 - n_1 n_2 + n_1)y^2 + k_z n_1 n_2)$$
$$(1 - n_2 - n_1 + n_1 n_2) = -p1p2p3$$

a controller parameter determining means configured to calculate each of parameter values $k_1$, $k_2$, $k_3$, $k_4$, $k_{i1}$, $k_{i2}$ that constitute said integral type control system by using each of the undetermined values from said undetermined value calculating means; and
a controller parameter outputting means configured to output each of the parameter values calculated by said controller parameter determining means to said robust digital controller.

6. A designing device of a robust digital controller according to claim 5, wherein said integral type control system incorporated into said robust digital controller, comprising:
a first feedforward means configured to output a product of said target value r and parameter $k_{r1}$,
a second feedforward means configured to output a product of said target value r and parameter $k_{r2}$, wherein
an output of said second feedforward means are added by the first adding means,
an output of said first feedforward means are added by the second adding means,
when said parameters are made up so as to satisfy $k_{r1}=gG$, $k_{r2}=g(GH_4+G(-F(1,4)+F(1,2)B_d(1,1)/A_d(1,2)))$,
said controller parameter determining means is configured to calculate each of said parameter values $k_1$, $k_2$, $k_3$, $k_4$, $k_{r1}$, $k_{r2}$, $k_{i1}$, $k_{i2}$, by using each of undetermined values from said undetermined value calculating means.

7. A designing device of a robust digital controller according to claim 5, wherein said designing device is further equipped with:

a characteristic judgment means configured to judge whether each of the parameter values calculated in said controller parameter determining means has been incorporated into said robust digital controller to judge whether desired characteristics can be obtained or not when said control target is controlled by the robust digital controller, a parameter respecifying means configured to trigger said parameter specifying means specify different parameter values $p_1$, $p_2$, $p_3$, $k_z$, when said characteristic judgment means has judged that no desired characteristic could be obtained and then making said controller parameter determining means calculate again the parameter values.

8. A designing device of a robust digital controller according to claim 7, further comprising a controller parameter outputting means configured to output each of parameter values calculated in said controller parameter determining means to said robust digital controller when said characteristic judgment means has judged that desired characteristics have been obtained.

* * * * *